(12) United States Patent
Levanon

(10) Patent No.: US 6,392,588 B1
(45) Date of Patent: May 21, 2002

(54) MULTIFREQUENCY SIGNAL STRUCTURE FOR RADAR SYSTEMS

(75) Inventor: Nadav Levanon, Ramat Gan (IL)

(73) Assignee: Ramot University Authority for Applied Research & Industrial Development Ltd., Tel Aviv (IL)

(*) Notice: Subject to any disclaimer, the term of this patent is extended or adjusted under 35 U.S.C. 154(b) by 0 days.

(21) Appl. No.: 09/564,650

(22) Filed: May 3, 2000

(51) Int. Cl.[7] ............................................... G01S 7/282
(52) U.S. Cl. ........................ 342/202; 342/203; 342/189
(58) Field of Search ................................ 342/202, 201, 342/203, 204, 189

(56) References Cited

U.S. PATENT DOCUMENTS

| | | | | |
|---|---|---|---|---|
| 3,654,554 A | * | 4/1972 | Cook | 375/340 |
| 3,806,816 A | * | 4/1974 | Kobayashi | 375/327 |
| 4,048,563 A | * | 9/1977 | Osborne | 375/367 |
| 4,804,961 A | * | 2/1989 | Hane | 342/125 |
| 4,853,701 A | * | 8/1989 | Drabowitch | 342/139 |
| 5,151,702 A | | 9/1992 | Urkowitz | 342/134 |
| 5,339,084 A | * | 8/1994 | Watanabe et al. | 342/160 |
| 5,376,939 A | | 12/1994 | Urkowitz | 342/134 |
| 5,440,311 A | * | 8/1995 | Gallagher et al. | 342/132 |
| 5,481,270 A | * | 1/1996 | Urkowitz et al. | 342/101 |
| 5,862,182 A | | 1/1999 | Awater et al. | 375/279 |
| 5,963,163 A | | 10/1999 | Kemkemian | 342/109 |
| 6,021,165 A | | 2/2000 | Ohkubo et al. | 375/344 |
| 6,252,535 B1 | * | 6/2001 | Kober et al. | 341/155 |
| 2001/0000660 A1 | * | 5/2001 | Kober et al. | 341/6 |

OTHER PUBLICATIONS

Le Floch Bernard, et al., "Digital Sound Broadcasting to Mobile Receivers", *IEEE Transe. Elec.*, 1989, 35, (3) pp. 493–503.

Jankiraman, M., et al., "System Design and Verification of the PANDORA Multifrequency Radar" *Proc. OF Int'l Conf. On Radar Syst.* Brest France, May 17–21, 1999, session 1.9.

Kretschmer Jr., F.F., et al., "Doppler Properties of Polyphase Coded Pulse Compression Waveforms" *IEEE Trans. Aerosp. Electron. Syst.*, 1983, 19, (4) pp. 521–531.

Huffman, D.A., "The Generation of Impulse–equivalent Pulse Trains" *IRETRANS. Inf. Theo.*, 1962, 8, pp. S10–16.

Ackroyd, M.H., "The Design of Huffman Sequences" *IEEE Trans. Aerosp. Electron. Syst.*, 1970, 6, (6), pp. 790–796.

Costas, J.P., "A Study of a Class of Detection Waveforms Having Nearby Ideal Range–Doppler Ambiguity Function Properties" *Proc. IEEE*, 1984, 72, (8), pp. 996–1009.

Popovic, B.M., "Complementary Sets Based on Sequences with Ideal Periodic Autocorrelation" *Electron. Lett.*, 1990, 26, (18), pp. 1429.

Farnett, E.C., et al., "Pulse Compression Radar" *Radar Handbook, 2nd edition*, Skolnik, M., Ed., (McGraw–Hill, 1990), Ch. 10.

Boyd, S., "Multitone Signals with Low Crest Factor" *IEEE Trans. Circuits and Systems*, 1986, 33, (10) pp. 1018–1022.

Golomb, S.W., "Two Valued Sequences with Perfect Periodic Autocorrelation" *IEEE Trans. Aerosp. Electron. Syst.*, 1992,28, (2), pp. 383–39–86.

Tseng, C.C., et al., "Complementary Sets of Sequences" *IEEE Trans. Inf. Theor.*, 1972, 18, (5), pp. 644–652.

Ipatov, V.P., et al., "Regular Binary Sequences with Small Losses in Supressing Sidelobes", *Radioelectronic and Communication Systems*, 1984,27,pp.29.33.

* cited by examiner

*Primary Examiner*—John B. Sotomayor
(74) *Attorney, Agent, or Firm*—Nath & Associates PLLC; Gary M. Nath; Marvin C. Berkowitz

(57) ABSTRACT

A multifrequency phase-coded signal structure is presented for use in a system like a radar or sonar or detecting a remote target. The signal structure comprises at least one pulse signal in the form of a mutually complementary set of M sequences, each sequence being composed of M phase-modulated bits. Each two adjacent sequences are modulated on subcarriers separated by a frequency $f_s$ such that $f_s=1/t_b$, $t_b$ being a bit duration, and a the subcarriers are transmitted simultaneously.

17 Claims, 24 Drawing Sheets

P4

$M \times M$ MCPC

MULTIFREQUENCY SIGNAL STRUCTURE FOR RADAR SYSTEMS

FIELD OF THE INVENTION

This invention is generally in the field of radar and similar ranging techniques for identifying remote targets, and relates to a signal structure to be transmitted towards a remote target which is to be identified.

BACKGROUND OF THE INVENTION

Radar and sonar systems identify targets and the range of targets by transmitting energy towards the target, and measuring the time between the transmission and reception of an echo from the target. A system of such kind typically comprises such main constructional parts as a signal generator/transmitter, an echo receiver, a filtering means, and a signal processing means. The filtering means typically include a Doppler filter aimed at identifying moving targets and distinguishing among targets moving with different radial velocities.

It is a common goal of such systems to improve the system resolution. Resolution is determined by the relative response of the radar to targets separated from the target to which the radar is matched. In other words, a target is set to be resolved if its signal is separated by the radar from those of other targets in it least one of the coordinates used to describe it.

The high speed and long range of modern airborne vehicles place increasing range demands on radar systems used for tracking. The long-range requirement typically requires relatively high transmitted energy (to detect small targets), which implies a relatively high peak transmitted power or a longer duration transmitter pulse. The latter reduced range resolution, i.e., the ability to distinguish among targets that are at similar ranges.

Pulse compression techniques are known to improve the range resolution in spite of the longer pulse duration. A technique involving frequency dispersion by transmitting a variable frequency "chirp" pulse allows the use of pulse compression filters at the receiver to reduce the effective pulse duration to thereby restore range resolution.

The main problem associated with pulse compression is the appearance of range sidelobes in addition to the main range lobe. The time position, or range, of the main lobe is the position that is tested for the presence of a target and for estimating the parameters of that target (i.e., reflected energy or power closing speed, fluctuations in echo power and closing speed, etc.). The presence of range sidelobes on the compressed pulse results in interfering echoes which originate at ranges other than the range of the main lobe. This interference can cause erroneous estimates of the echo characteristics in the range increment covered by the main lobe.

One of the known techniques for suppressing range sidelobes is consists in applying phase coding to the transmitted pulse, so that the coding appears in the received echo pulse, and in applying code-matched filtering to the compressed received pulses.

According to another known technique of the kind specified, complementary phase sequences are imposed on the transmitted signal. This technique is disclosed for example in U.S. Pat. No. 5,151,702. Here, the transmitted pulses are organized into mutually complementary sets. More specifically, pairs of complementary phase sequences are transmitted sequentially, sequentially Doppler filtered, and the filtered pulse sets are, in turn, compressed by filtering matched to the coding. U.S. Pat. No. 5,376,939 discloses a radar system in which transmission takes place simultaneously at two different frequencies, spaced far apart, and in which each of the transmissions is coded with one of two mutually complementary codes.

Generally, "complementary codes" are basically characterized by the property that the autocorrelation vector sum is zero everywhere except for the zero shift. Two pulses are "mutually complementary" in that, after pulse compression by matched filtering, the sidelobes are equal but of opposite sign, while the main lobes add producing an enhanced main lobe with no sidelobes.

U.S. Pat. No. 5,963,163 discloses a technique for frequency-modulated continuous wave (FMCW) radar detection wit removal of ambiguity between the distance and the speed. According to this technique, the radar sends out at least alternately two parallel and discontinuous frequency modulation ramps that are slightly offset by a frequency variation. The frequency switches from one ramp to the other at the end of a given duration. The distance from a detected target is estimated as a function of the difference in phase between a received signal corresponding to the first ramp and a received signal corresponding to the second ramp. The speed of the target is obtained from the estimated distance and the ambiguity straight line associated with the target.

It is known that range (delay) resolution is inversely related to the radar signal bandwidth. The quest for higher bandwidth usually follows shorter bit duration in digital phase modulated signals, or wider frequency deviation in analog frequency modulated signals. In radio communications, where it is advantageous to increase bitrate without shortening the bit duration, one solution is the use of a modulation technique known as Orthogonal Frequency Division Multiplexing (OFDM). The main principles and advantageous features of OFDM technique suggested for Digital Audio Broadcasting and other applications are disclosed, for example, in the article "*Digital Sound Broadcasting to Mobile Receivers*", Le Floch, Halbert-Lassalle, B. R,. and Castelain D., *IBEEE Trans. Consum. Elec.*, 1989, 35, (3) pp. 493–503, and in U.S. Pat. Nos. 5,862,182 & 6,021,165.

OFDM broadcasts have multiple subcarrier signals, on which data are transmitted in parallel. The basic idea of OFDM is to replace transmitting serially M short modulation symbols each of duration $t_c$, by transmitting M long symbols, each of duration $t_b$ such that $t_b = Mt_c$, wherein these M long modulation symbols are transmitted in parallel on M different subcarriers. In OFDM, the subcarriers are separated by $1/t_b$, which ensures that the subcarrier frequencies are orthogonal and phase continuity is maintained from one symbol to the next.

As for the radar systems, simultaneous use of several subcarriers there was recently disclosed in the following article: Jankiraman, M., B. J. Wessels, and P. Van Genderen, "*System Design and Verification of the PANDORA Multifrequency Radar*", Proc. of Int'l. Conf On Radar Syst., Brest, France, 17–21 May 1999, Session 1.9. Here, FMCW radar achieves bandwidth of 384 MHZ by using eight Linear-FM (LFM) channels, each sweeping 48 MHz. Together with guard bands, the bandwidth totals 776 MHz. A multifrequency signal is characterized by varying amplitude. Amplifying such a signal requires linear power amplifiers (LPA), which are relatively inefficient. The technique disclosed in this article is directed towards power combining and amplification.

A modern replacement of the analog LFM signal is a digital phase-coded signal, for example the polyphase codes P1, P2, P3 and P4 disclosed in the following publication: Kretschmer, F. F. and Lewis, B. L., "*Doppler Properties of Polyphase Coded Pulse Compression Waveforms*", IEEE Trans. Aerosp. Electron. Syst., 1983, 19, (4), pp. 521–531. These signals are such that their phase sequences are samples from the phase history of a LFM signal. These codes can be obtained from considering the sampled phases of the step-chirp and chirp baseband waveforms. These codes can be digitally compressed by using fast Fourier transform (FFT) directly or by a fast convolution technique.

SUMMARY OF THE INVENTION

The present invention provides a novel multifrequency signal structure for use in the radar or the like target detection system. The main idea of the present invention is based on the inventor's investigation showing that lower autocorrelation sidelobes are reached when M sequences, modulated on the M subcarriers, are different from each other and constitute a complementary set. The inventor calls such a signal structure as Multifrequency Complementary Phase Coded (MCPC) signal of size M×M.

The signal structure according to the invention utilizes M subcarriers simultaneously. The subcarriers are phase modulated by M different sequences that constitute a complementary set. Such a set can be constructed, for example, from the M cyclic shifts of a perfect phase-coded sequence of length M (e.g., P4 signal). The subcarriers are separated by the inverse of the duration of a phase element $t_b$, yielding the above-indicated OFDM feature, well known in communications. The signal exhibits a thumbtack ambiguity function with delay resolution of $t_b/M$.

The ambiguity function $|X(\tau,v)|$ is known to be defined as follows:

$$|X(\tau, v)| = \left| \int_{-\infty}^{\infty} u(t)u^*(t-\tau)\exp(j2\pi vt)dt \right|$$

wherein $\tau$ is the time delay between the reference (stored in the receiver) and received signals; $v$ is Doppler shift; $t$ is the time coordinate; $u(t)$ is complex envelope of the signal; $u^*(t)$ is its complex conjugate; and $j=(-1)^{1/2}$.

The complex envelope $u(t)$ of a real signal $s(t)=g(t)\cos[2\pi f_c t+\phi(t)]$, wherein $g(t)$ is real envelope, $\phi(t)$ is phase, and $f_c$ is carrier frequency, is defined as follows:

$$u(t)=g(t)\cos[\phi(t)]+j\,g(t)\sin[\phi(t)]$$

The autocorrelation of $u(t)$ is determined as follows:

$$r(\tau) = \int_{-\infty}^{\infty} u(t)u^*(t-\tau)dt$$

wherein $|r(\tau)|=|X(\tau,0)|$.

The power spectrum is relatively flat, with a width of $M/t_b$. The signal structure can be constructed by power combining M fixed-amplitude signals. The resulting signal, however, is of variable amplitude. The peak-to-mean envelope power ratio can be maintained below 2. A train of complementary pulses and a weight function along the frequency axis can be used for further sidelobe reduction.

Power spectral density $P_u(f)$ of a finite-duration signal with complex envelope $u(t)$ is determined as follows:

$$P_u(f)=|U(f)|^2$$

wherein $U(f)$ is the Fourier transform of $u(t)$, that is:

$$U(f) = \int_{-\infty}^{\infty} u(t)\exp(-j2\pi ft)dt$$

There is thus provided according to the present invention a multifrequency phase-coded signal structure to be used in a system for detecting a remote target, the signal structure comprising at least one pulse signal in the form of a mutually complementary set of M sequences, each sequence being composed of M phase-modulated bits, wherein each two adjacent sequences are modulated on subcarriers separated by a frequency $f_s$ such that $f_s=1/t_b$, $t_b$ being a bit duration, and wherein all the subcarriers are transmitted simultaneously.

The term "signal structure" utilized herein signifies that the entire number of M sequences within the structure, modulated on the M subcarriers, are transmitted simultaneously as a common pulse signal.

An extension of the "signal structure" is a coherent train of M pulses separated in time, wherein each pulse in the train is designed as described above, thus achieving complementary in time as well as in frequency. To this end, for example, each pulse in the train may exhibit a different order of the same complementary set of sequences, such that a set of complementary phase sequences is obtained in each subcarrier frequency. In other words, such a signal structure presents a matrix, whose columns are the pulses separated in time and raws are the subcarrier separated in frequency. The phase elements in each raw and in each column constitute a complementary set.

Frequency weighting can be applied by assigning different amplitude to each subcarrier in the case of the single pulse, or by maintaining, over all the pulses, same amplitude in the subcarriers with the same frequency, in the case of the so-called "extended structure". Different amplitude values may be assigned in accordance with the symmetry condition. This means, that if 5 subcarriers are used, then the amplitude of $1^{st}$ subcarrier is equal to that of the $5^{th}$ subcarrier, and the amplitude of the $2^{nd}$ subcarrier is different from that of the $1^{st}$ and $5^{th}$ subcarriers, but equal to that of the $4^{th}$ subcarrier.

The complementary set may be constructed based on a phase sequence in the form of a polyphase code signal, such as P4 or P3. The phase modulation may also be 2-valued, for example utilizing Golomb code signal, or Ipatov code signal.

The above signal structure can be used in a radar system of any known kind, provided its transmitter unit is capable of simultaneously generating M subcarrier frequencies which define together the multifrequency signal designed as described above, and its receiver is matched to his signal structure.

Generally speaking, when ordering the complementary set over the M frequencies, at least one of the following conditions should be satisfied:

(1) Low autocorrelation sidelobes RMS (root-mean-square or effective value), $SL_{RMS}$. The RMS of the autocorrelation $r(t)$ sidelobes of an MCPC signal is as follows:

$$SL_{RMS} = \sqrt{\frac{1}{Mt_b}\int_{\tau=\frac{t_b}{M}}^{Mt_b}[r(\tau)]^2 d\tau}$$

(2) Low peak autocorrelation sidelobes, $SL_{peak}$, which is determined as follows:

$$SL_{peak}=\max[r(\tau)],\ t_b<|\tau|<Mt_b$$

(3) Low peak sidelobes of the two-dimensional ambiguity function; and (4) Low peak-to-mean envelope power ratio (PMEPR)

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1A:
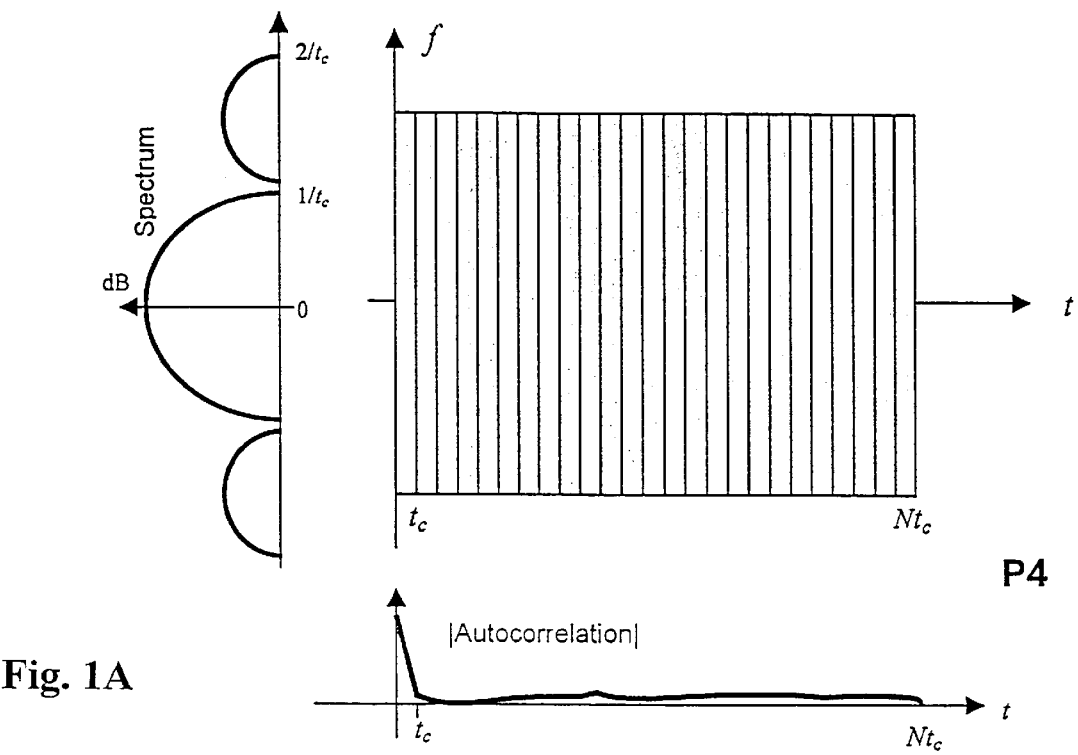
FIG. 1A schematically illustrates the characteristics of a conventional 25-bit P4 signal.

Following are several examples of the MCPC signal according to the invention and the comparison of their performances to the above-indicated P4 signal, Huffman signal and Costas signals.

Huffman signal is described in the following publications: Huffman, D. A., "*The Generation of Impulse-Equivalent Pulse Trains*", *IRE Trans, Inf. Theo.*, 1962, 8, pp. S10–S16; and Ackroyd, M. H., "*The Design of Huffman Sequences*", *IEEE Trans. Aerosp. Electron. Syst.*, 1970, 6, (6), pp. 790–796. Costas signals are disclosed in the following publication: Costas, J. P., "*A Study of a Class of Detection Waveforms Having Nearly Ideal Range-Doppler Ambiguity Function Properties*", *Proc. IEEE*, 1984, 72, (8), pp. 996–1009.

The phase sequence of P4 and P3 signals are described, respectively, by the following equations:

$$\phi_m = \frac{\pi}{M}(m-1)^2 - \pi(m-1), m = 1, 2, \ldots, M \tag{1a}$$

$$\phi_m = \frac{\pi}{M}(m-1)^2, m = 1, 2, \ldots, M, \quad M \text{ even} \tag{1b}$$

wherein $\phi_m$ is phase of the $m^{th}$ bit.

P4 and P3 signals exhibit ideal periodic autocorrelation, namely, zero periodic autocorrelation sidelobes. Deducing from simultaneous transmission of LFM pulses would have led us to suggest repeating the same phase sequence on all M subcarriers. However, phase coded signals yield an additional degree of freedom in the form of cyclic shift. It is known from the article "*Complementary Sets Based on Sequences with Ideal Periodic Autocorrelation*", Popovic, B. M., *Electron. Lett.*, 1990, 26, (18), pp. 1428–1430, that all the different cyclic time shifted versions of any sequence having an ideal periodic autocorrelation function, form a complementary set.

A complex valued sequence $X_i$, whose $k^{th}$ element is $s_i(k)$, forms a complementary set if the sum $Z(p)$ of the a periodic autocorrelation function $R_i$ of all sequences from the set is equal to zero for all nonzero time shifts p, that is:

$$Z(p) = \sum_{i=0}^{M-1} \sum_{k=0}^{M-1-p} s_i(k) s_i^*(k+p) = \begin{cases} \sum_{i=0}^{M-1} R_i(0), & p = 0 \\ 0, & p \neq 0 \end{cases} \tag{2}$$

wherein denotes complex conjugate, p is the (positive) time shift, and $R_i(0)$ is the energy of the sequence $X_i$.

When the set has only two sequences (a complementary pair), the two sequences (of equal length M) must have aperiodic autocorrelation functions whose sidelobes are equal in magnitude but opposite in sign. The sum of the two autocorrelation functions has a peak of 2 M and a sidelobe level of zero.

In order to take advantage of this autocorrelation property in radar signals [Farnet, E. C. and Stevens, G. H., "*Pulse Compression Radar*", Radar Handbook, $2^{nd}$ edition, Skolnik, M., Ed., (McGraw-Hill, 1990), Ch. 10], the sequences must be separated, for example in time (two different pulses). With large time separation, even small Doppler shift causes large phase shift, and the sequences quickly lose the property of cancelled autocorrelation sidelobes.

The use of multiple subcarriers provides another possibility of separation—frequency. Let us investigate the properties of such a signal using a simple complementary set constituted of five shifts of a P4 signal of length 5. The basic phase sequence is obtained by using M=5 in the above equation (1a). It is shown in the top row of a Table 1 below showing a set of five complementary phase coded sequences. The remaining rows are all the remaining cyclic shifts.

TABLE 1

Set of 5 complementary phase coded sequences

| Sequence 1 | 0° | −144° | −216° | −216° | −144° |
|---|---|---|---|---|---|
| Sequence 2 | −144° | −216° | −216° | −144° | 0° |
| Sequence 3 | −216° | −216° | −144° | 0° | −144° |
| Sequence 4 | −216° | −144° | 0° | −144° | −216° |
| Sequence 5 | −144° | 0° | −144° | −216° | −216° |

Following the OFDM approach, the M (M=5) sequences will be transmitted on M subcarriers, separated by $f_s=1/t_b$, where $t_b$ is the duration of each phase element (bit). The complex envelope of the transmitted signal is therefore $$u(t) = \begin{cases} \sum_{n=1}^{M} W_n \exp\left\{j\left[2\pi t f_s\left(\frac{M+1}{2}-n\right)+\theta_n\right]\right\} \sum_{m=1}^{M} u_{n,m}[t-(m-1)t_b], & 0 \leq t \leq Mt_b \\ 0, & \text{elsewhere} \end{cases}$$

wherein $$u_{n,m}(t) = \begin{cases} \exp(j\phi_{n,m}), & 0 \leq t \leq t_b \\ 0, & \text{elsewhere} \end{cases} \quad (4)$$

Here, $\phi_{n,m}$ is the $m^{th}$ phase element of the $n^{th}$ sequence, and $\theta_n$ is an arbitrary phase shift added by the transmitter hardware to each carrier (known to the receiver), and $W_n$ is the amplitude weight assigned to the corresponding subcarrier. The values of $W_n$ are in general equal to 1, unless frequency weighting is applied. The above equations (3) and (4) describe the complex envelope of M×M MCPC signal.

Figure 1B:
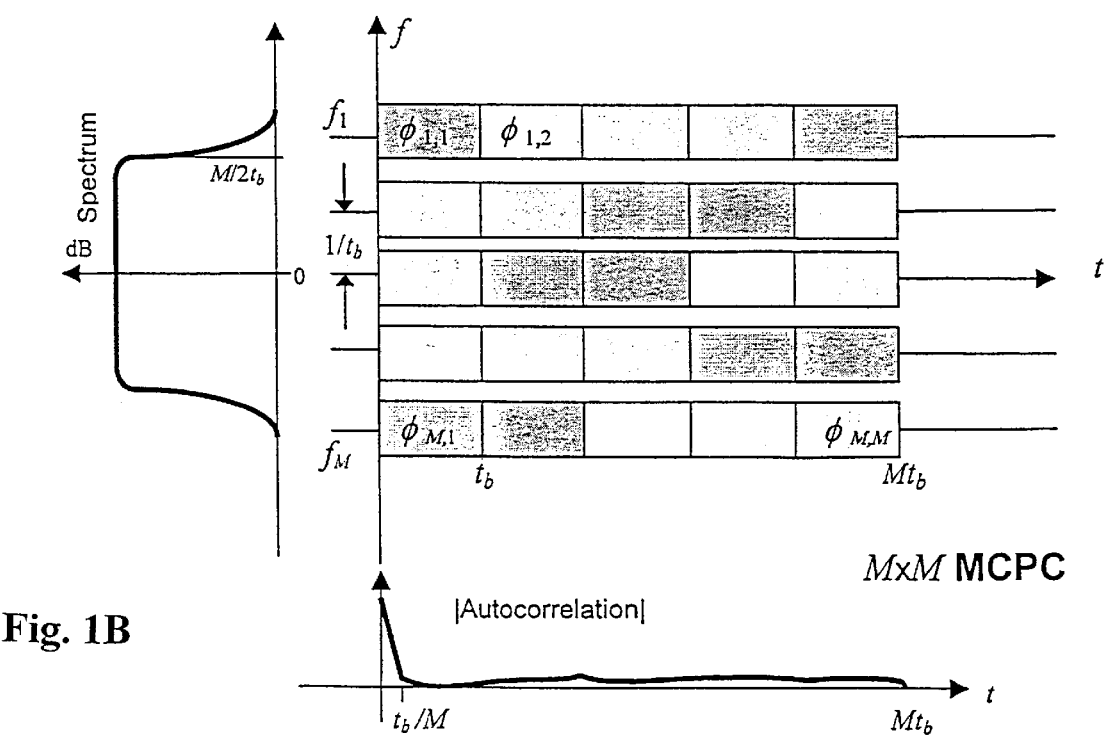
FIG. 1B schematically illustrates the characteristics of one possible example of a M×M MCPC signal (M=5) according to the invention.

Referring to FIGS. 1A and 1B, the M×M MCPC signal (M=5) is compared to the P4 signal (N=25). FIG. 1A schematically illustrates a 25-bit P4 signal, and FIG. 1B illustrates a 5×5 MCPC signal. The P4 signal is constructed from N phase modulation bits, each of duration $t_c$. The typical autocorrelation of such a P4 signal exhibits a narrow main lobe at zero delay, a first null at $t_c$, and low sidelobes extending as far as the signal duration $Nt_c$. The power spectral density of P4 resembles a $\sin^2(\pi ft_c)/(\pi ft_c)^2$ function. The first null is at $f=1/t_c$, and the spectrum peak sidelobe level is (−26) dB.

FIG. 1B shows M (M=5) sequences modulating M subcarriers. The bit duration $t_b$ in each sequence was chosen to be M times longer than $t_c$. This will yield an autocorrelation main lobe width similar to that of the P4 signal with $M^2$ (i.e., 25) bit. The MCPC signal exhibits a more efficient spectrum usage. Indeed, as depicted in FIG. 1B, the power spectrum is nearly rectangular with cutoff at $f \approx M/(2t_b)$.

Figure 2:
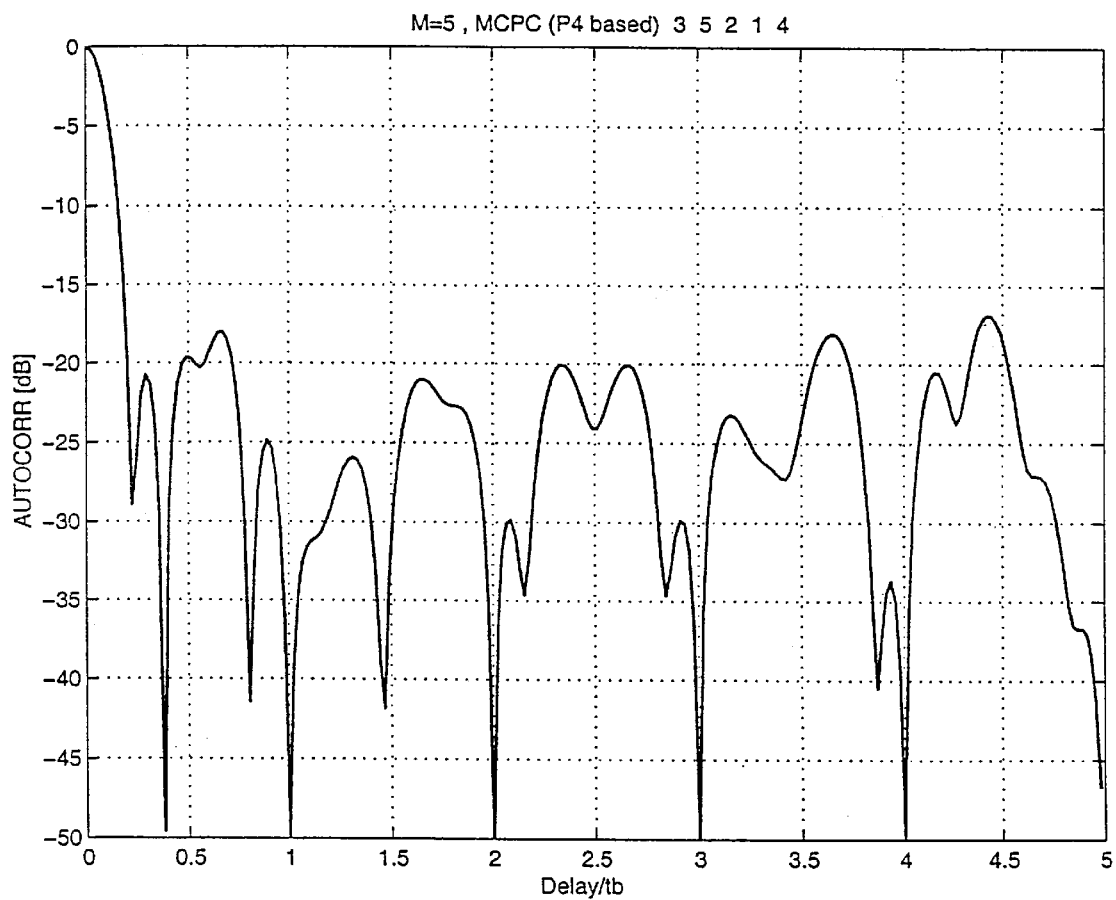
FIG. 2 graphically illustrates the autocorrelation function of the MCPC signal of FIG. 1B.

The ambiguity function and its zero-Doppler cut (the magnitude of the autocorrelation) of u(t) depends on the permutation of the five sequences along the five subcarriers ($2f_s$, $f_s$, 0, $-f_s$, $-2f_s$). FIG. 2 illustrates the autocorrelation (magnitude) resulting from a preferred permutation (i.e., low sidelobe RMS). The first null appears at $t_b/5$. This means that by using five subcarriers, autocorrelation is created resembling that of a single-frequency signal, which, over the same total duration, has 5 times as many bits. The nulls of the autocorrelation function at multiples of $t_b$ result from the combination of the orthogonality ($f_s=1/t_b$) and the complementary set.

Figure 3:
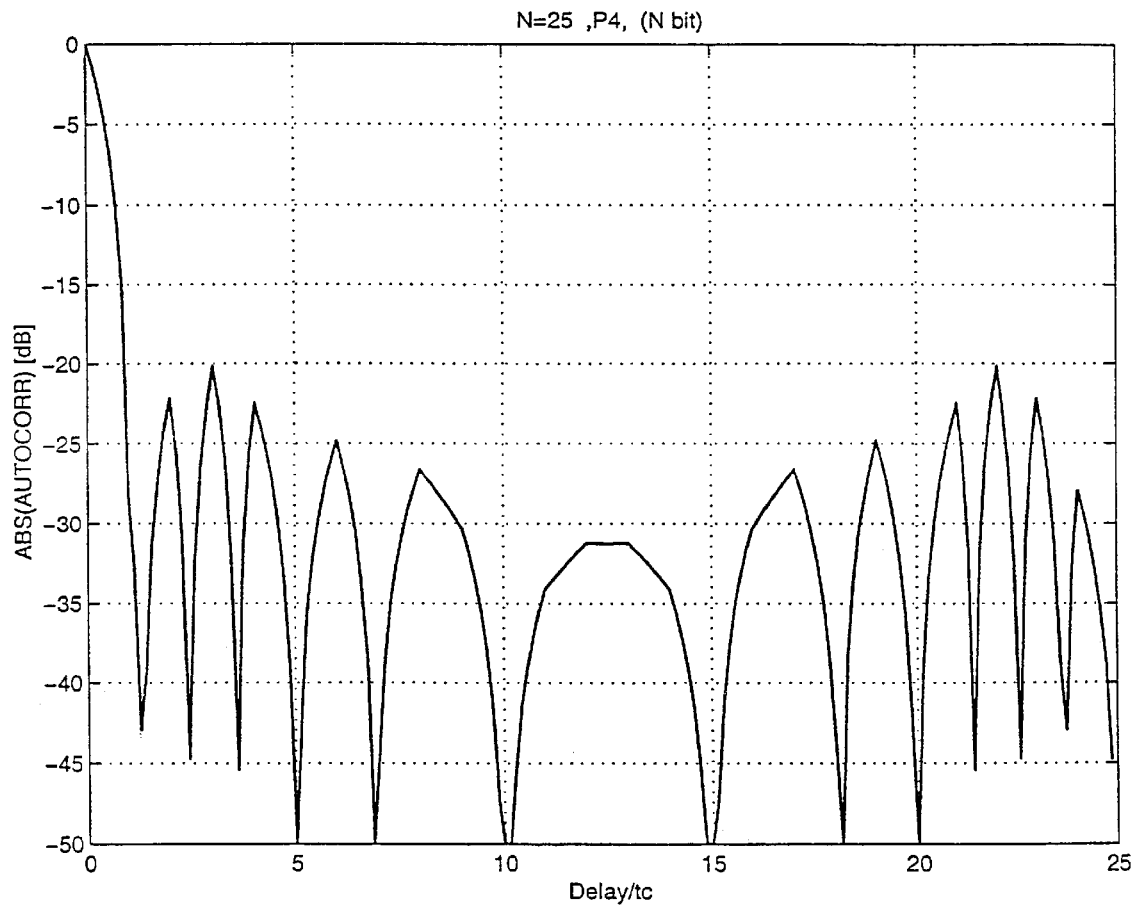
FIG. 3 graphically illustrates the autocorrelation function of the conventional 25-element P4 signal of FIG. 1A.

FIG. 3 illustrates the autocorrelation function of a P4 signal of length 25. The phase sequence of the 25-element P4 signal uses 13 distinct phase values. This compares with only 3 distinct values in Table 1.

Figure 4:
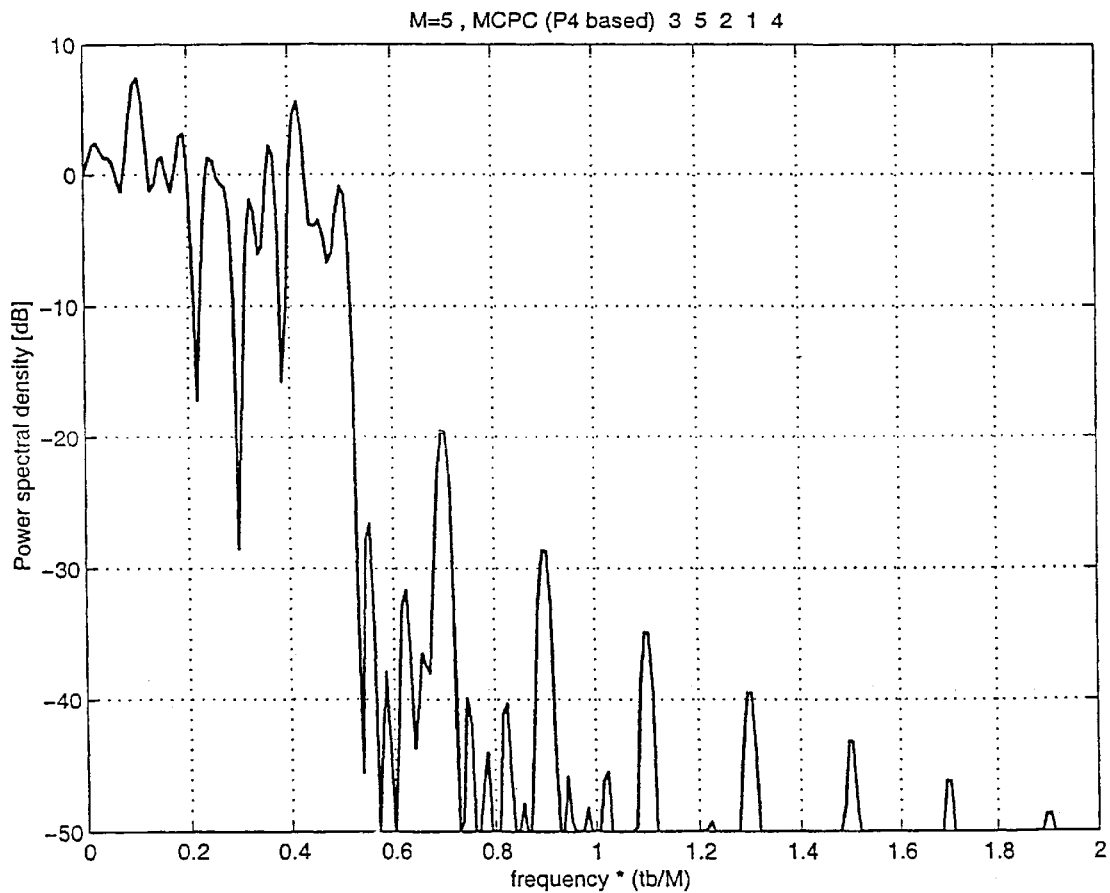
FIG. 4 graphically illustrates the power spectrum of the MCPC signal of FIG. 1B.
Figure 5:
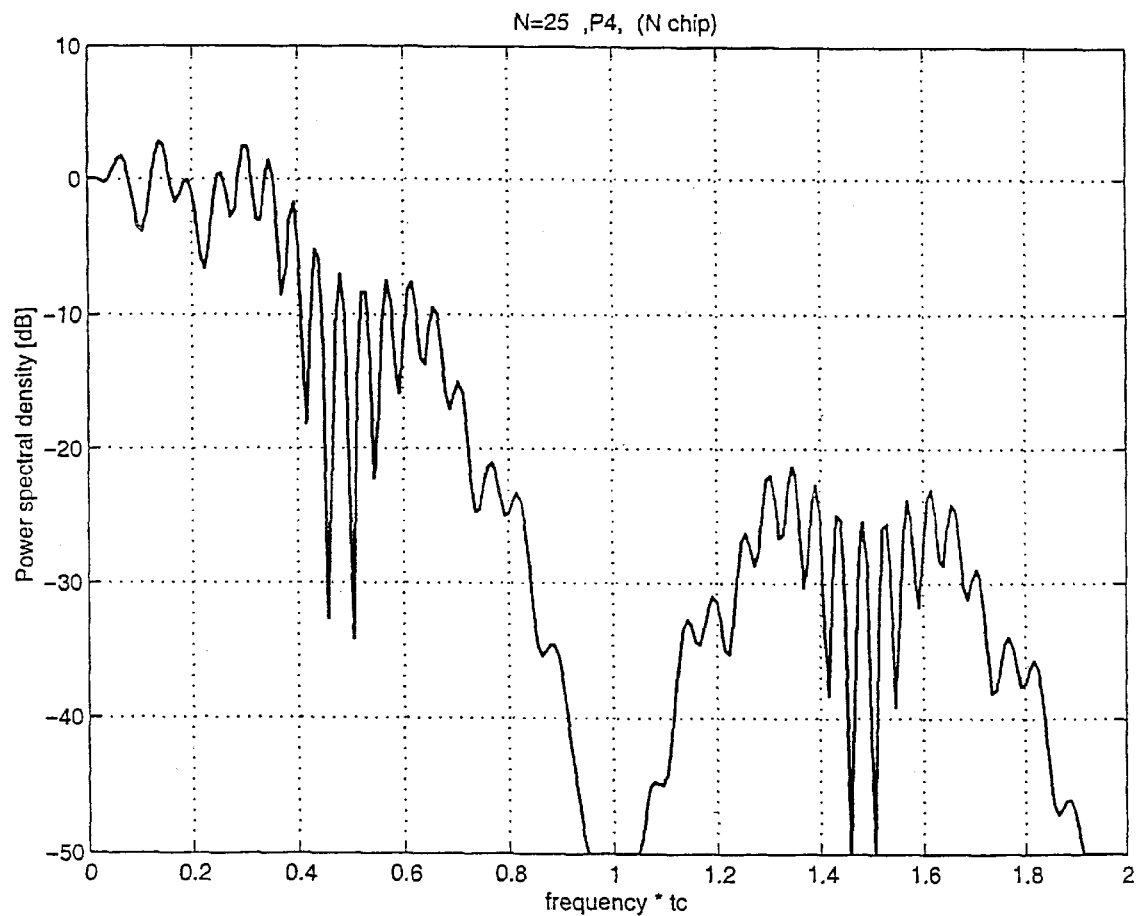
FIG. 5 graphically illustrates the power spectrum of the conventional 25-element P4 signal of FIG. 1A.

Two other interesting aspects to compare the autocorrelation functions of FIG. 2 (P4-based MCPC signal) and FIG. 3 (25-element P4 signal), are the occupied spectrum and the Doppler sensitivity. FIGS. 4 and 5 illustrate the power spectral densities (PSD) of, respectively, the MCPC signal obtained from the Fourier transform (FT) of the autocorrelation function shown in FIG. 2 and the 25-element P4 signal obtained from the FT of the autocorrelation function shown in FIG. 3. In general, the MCPC signals exhibit a more narrow and flat spectrum (of the complex envelope) extending up to the maximal frequency $f_{max}$, which is:

$$f_{max} \approx \frac{M}{2t_b} \quad (5)$$

The bandwidth BW of the band-pass signal around its center frequency will therefore be:

$$BW = 2f_{max} \approx \frac{M}{t_b} \quad (6)$$

Figure 6:
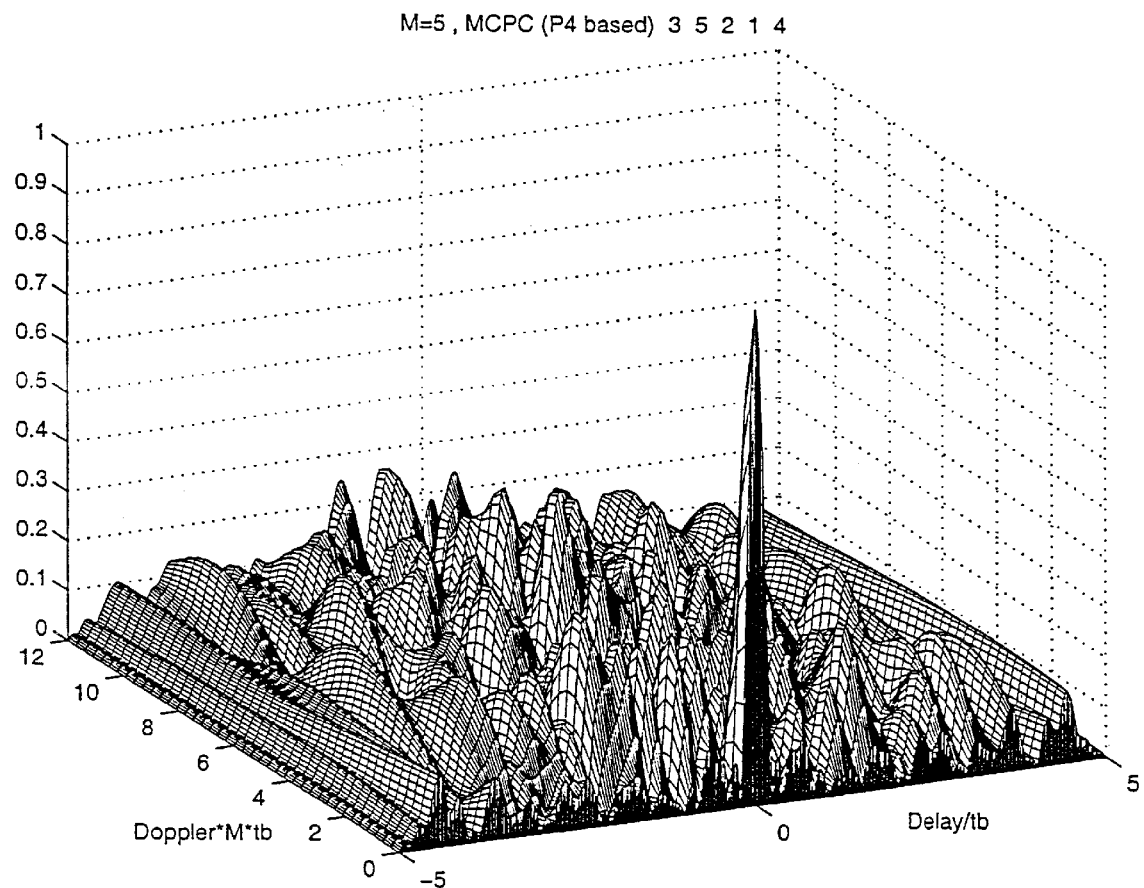
FIG. 6 is a graph of the ambiguity function of the MCPC signal of FIG. 1B.
Figure 7:
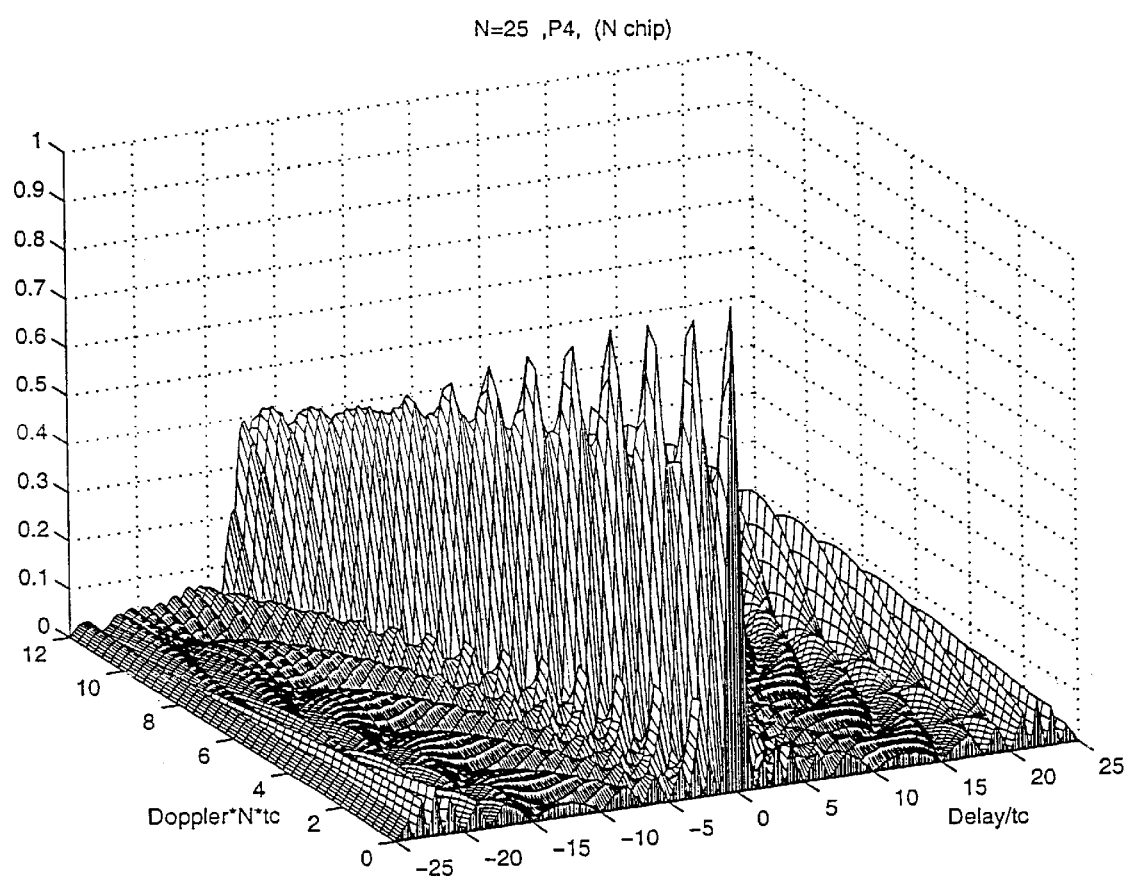
FIG. 7 is a graph of the ambiguity function of the 25-element P4 signal of FIG. 1A.

As for the sensitivity to Doppler shift, it is described by the ambiguity function. FIGS. 6 and 7 illustrate the $1^{st}$ and $2^{nd}$ quadrants for, respectively, the 5×5 MCPC signal and the 25-element P4 signal. Comparing these two graphs, it is evident that the ambiguity function of the MCPC signals does not exhibit the ridge seen in the ambiguity function of the P4 signal (also typical of LFM). Zooming will reveal that there is no rapid increase of the sidelobe level with small Doppler shift.

The performances of the MCPC signal were calculated assuming no hardware inserted phase shifts and no frequency weighting, namely, in the above equation (3) we assumed $\theta_n=0$ and $W_n=1, \ldots, M$. Phase shifts other than zero will slightly modify the spectrum and the sidelobe patterns of the ambiguity function. The resulting effect will be similar to that of using a different order of the sequences.

Figure 8:
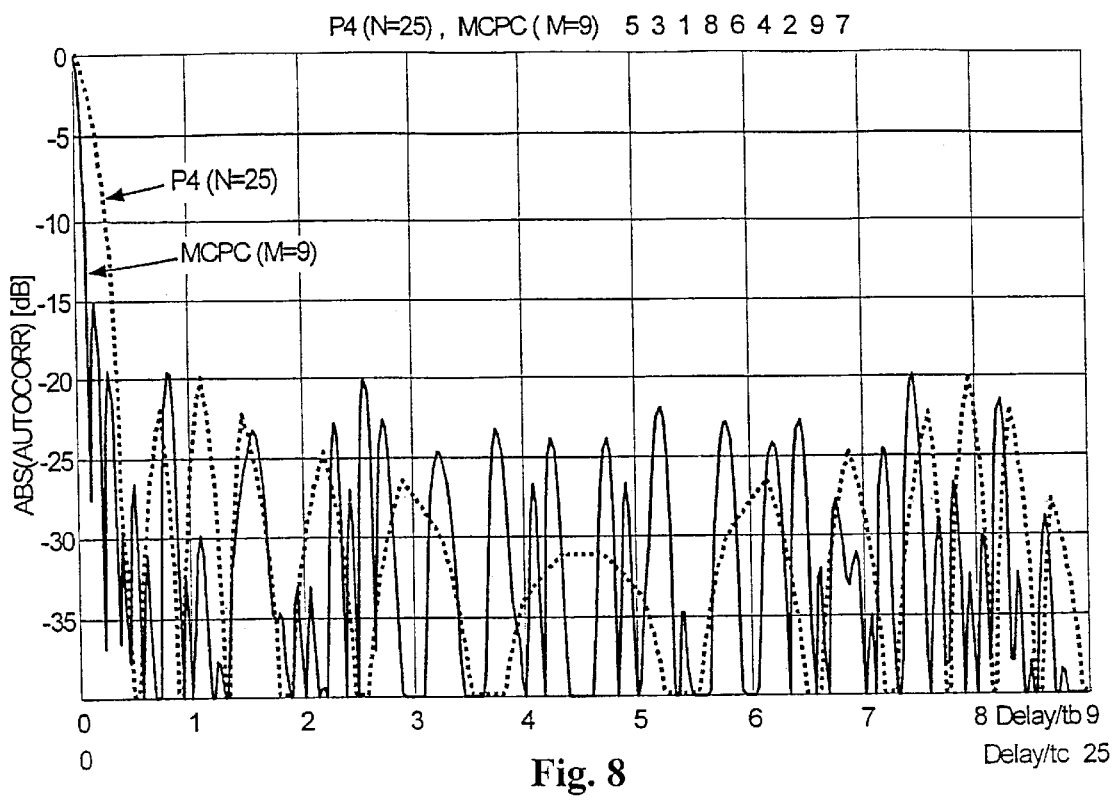
FIG. 8 illustrates autocorrelation functions of another example of M×M MCPC signal (M=9), and of the 25-element P4 signal.
Figure 9:
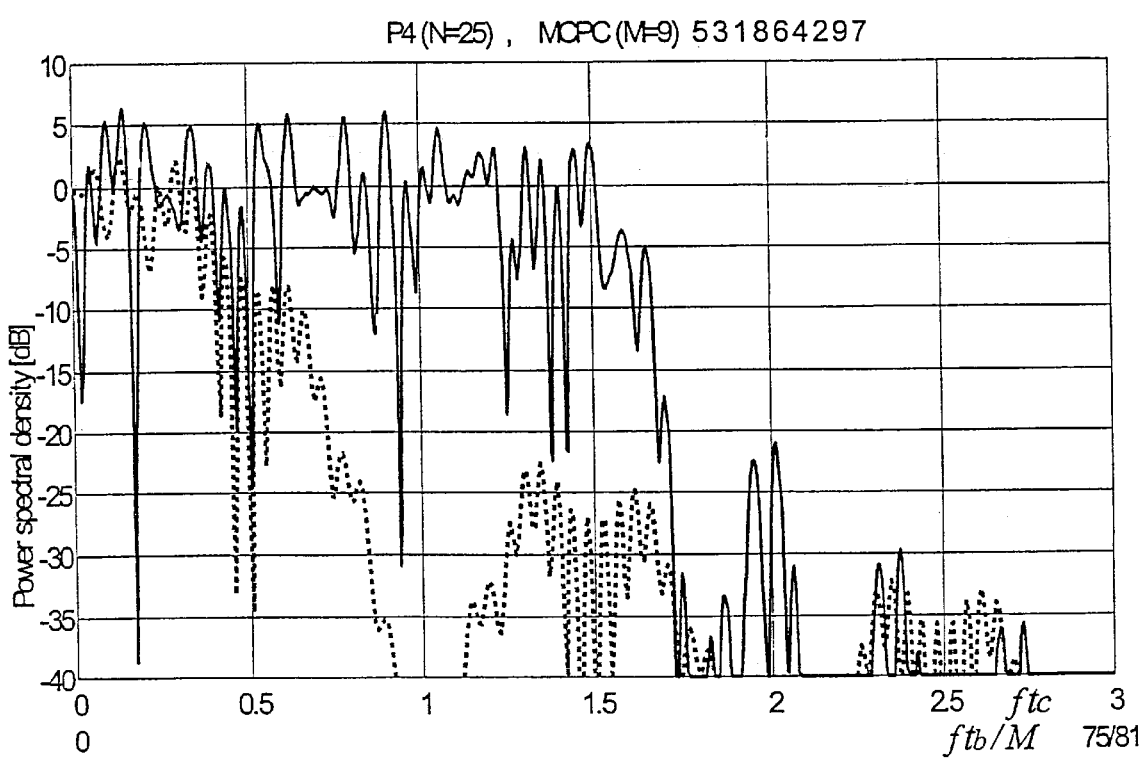
FIG. 9 illustrates power spectrums of the 9×9 MCPC signal and of the 25-element P4 signal.

Reference is now made to FIGS. 8 and 9, enabling to compare between M×M MCPC signal for M=9 and a 25-element P4 signal (i.e., N=25). FIG. 8 illustrates autocorrelation function (in decibels) of the MCPC signal (solid curve) and autocorrelation function of P4 signal (dashed curve). FIG. 9 shows power spectrums of MCPC and P4 signals by, respectively, solid and dashed curves.

From a spectral-width point of view it is more reasonable to compare the 25-element P4 signal with a 9×9 MCPC signal. The sequence order of the MCPC signal is that order which yields the lowest RMS sidelobe level found by an exhaustive search (valid as long as $\theta_n=0$, n=1, ..., M). As shown in FIG. 8, both autocorrelation functions have a similar peak-sidelobe level of −20 dB, yet a much narrower mainlobe of the MCPC signal. The ratio of the first delay nulls is $$\frac{\tau_{null,MCPC}}{\tau_{null,P4}} = \frac{N}{M^2} = \frac{25}{81} \approx 0.3 \quad (7)$$

It is evident from FIG. 9, that the 25-element P4 signal occupies the same spectrum as the 9×9 MCPC signal.

Studying MCPC signals of other sizes reveals a clear sidelobe level drop as M increases. For $M \leq 13$, empirical relationship of the sidelobe RMS value ($SL_{RMS}$) in decibels is 20 log($SL_{RMS}$)≈−(1.13M+17.7). The best found permutations were used to obtain the relationship. However, for $M \geq 11$ the large number of permutations ($11! \approx 4.10^7$) excludes an exhaustive search. The large number of permutations could be exploited when many similar radar units must coexist in physical proximity, e.g., in automotive radar applications.

Let us now consider such important parameter as peak-to-mean envelope power ratio (PMEPR). The MCPC signal is characterized by varying envelope. If the signal generator contains a power amplifier, then it becomes desirable to reduce the PMEPR as much as possible. The orthogonality of the MCPC signal implies that over a bit duration, one subcarrier does not affect the others. Hence, if each subcarrier is of unit power, then the mean power of the M subcarriers must be M. Clearly, the instantaneous peak power during a bit can be at most $M^2$. It can therefore be conclude that in general:

$$PMEPR \leq M \quad (8)$$

The inventor has found out numerically that when the MCPC is based on all the cyclic shifts of a P4 signal, $M \leq 4$, and the sequence order is also a cyclic shift, namely:

$$\{k, k+1, \ldots, M-1, M, 1, 2, \ldots, k-1\} \text{ or } \{k, k-1, \ldots, 2, 1, M, M-1, \ldots, k+1\} \quad (9)$$

then:

$$PMEPR \leq 2.015 \quad (10)$$

The above result in (10) has been pointed out in the following publication Boyd, S., "*Mutltitone Signals with Low Crest Factor*", IEEE Trans. Circuits and Systems, 1986, 33, (10), pp. 1018–1022. There, a case of a multitone symbol in which the phase sequence (along the M frequencies) follows a P3 phase sequence was considered, being called "Newman phases".

Figure 10:
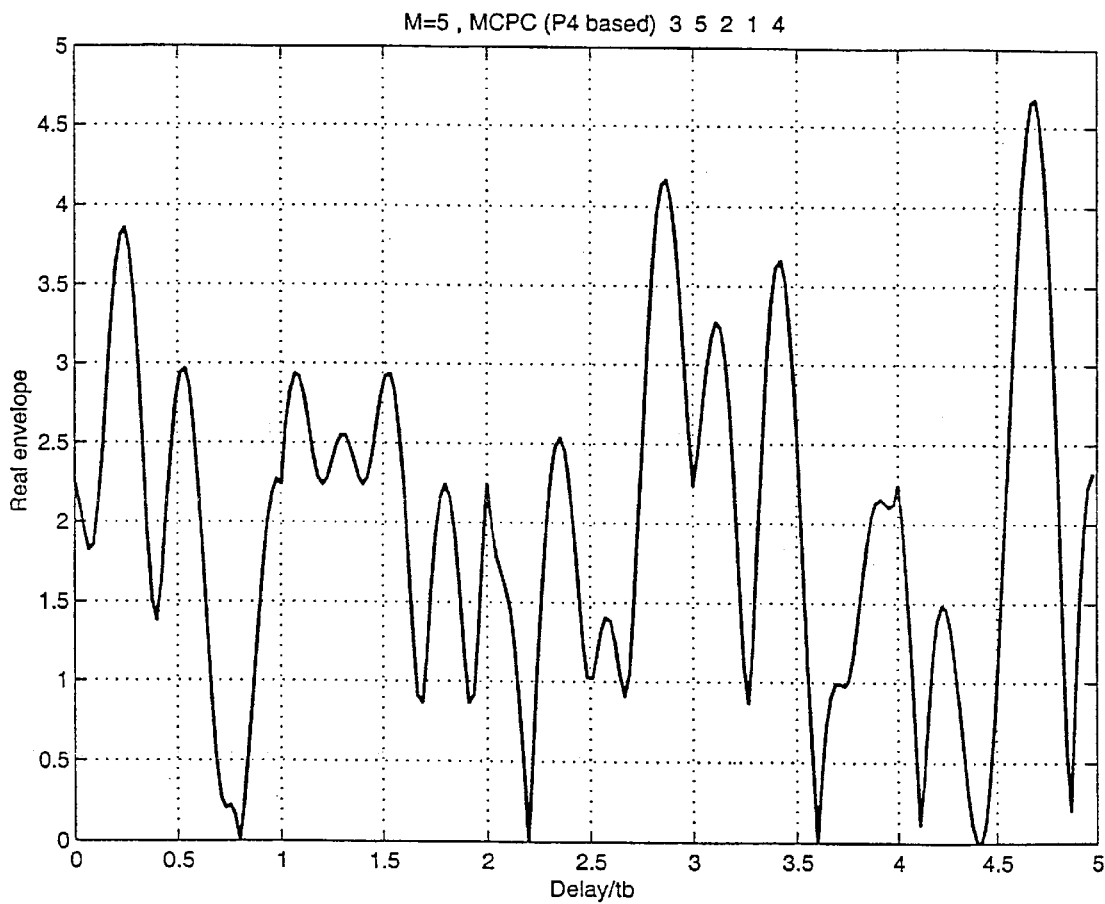
FIGS. 10 and 11 show real envelopes of the 5×5 MCPC signals with the sequence orders {3 5 2 1 4} and {3 4 5 1 2}, respectively.
Figure 11:
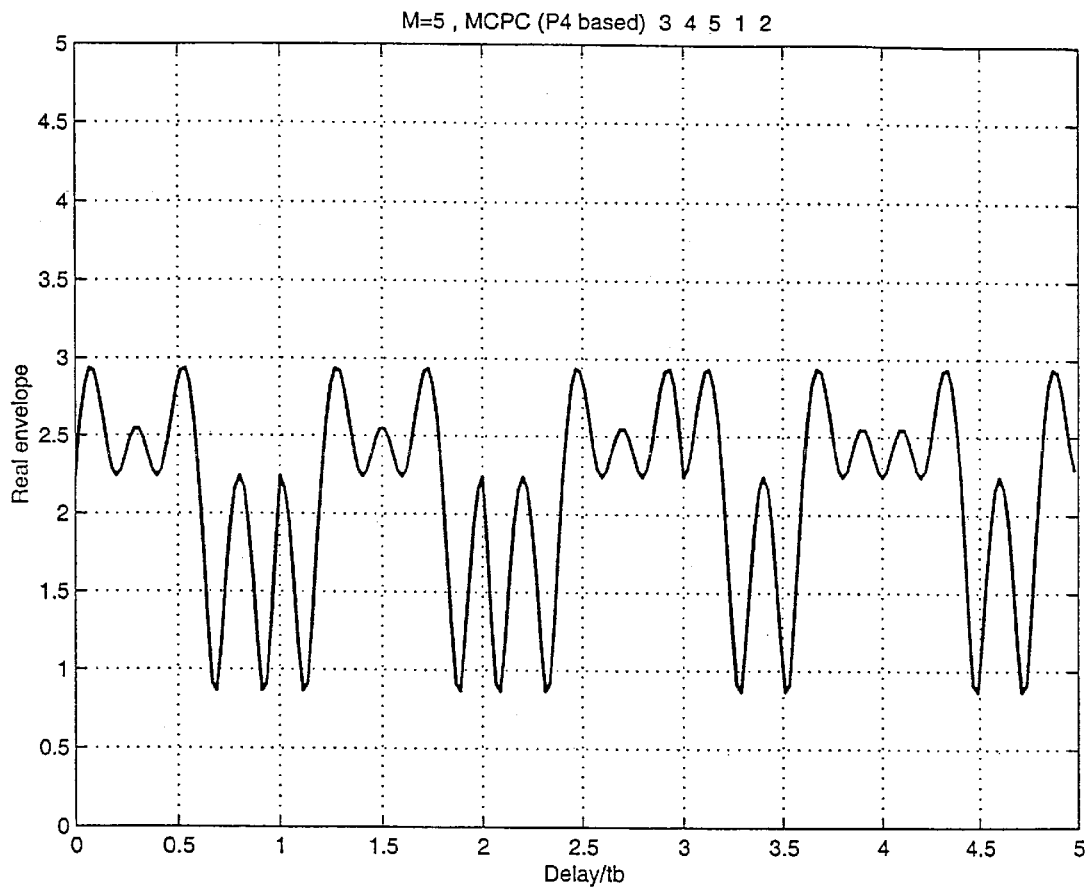

FIGS. 10 and 11 demonstrate the lower PMEPR for the above order of sequences (9), showing the real envelopes of 5×5 MCPC signals based on P4 with the sequence orders {3 5 2 1 4} and {3 4 5 1 2}, respectively. The later one meets the criteria in (9). The corresponding PMEPR values are 4.37 and 1.73.

The autocorrelation sidelobes may be further reduced by using a coherent train of M MCPC pulses complementary in time, as well as in frequency. This happens when each pulse in the train exhibits a different order of sequences such that a set of complementary phase sequences is obtained in each frequency.

Figure 12:
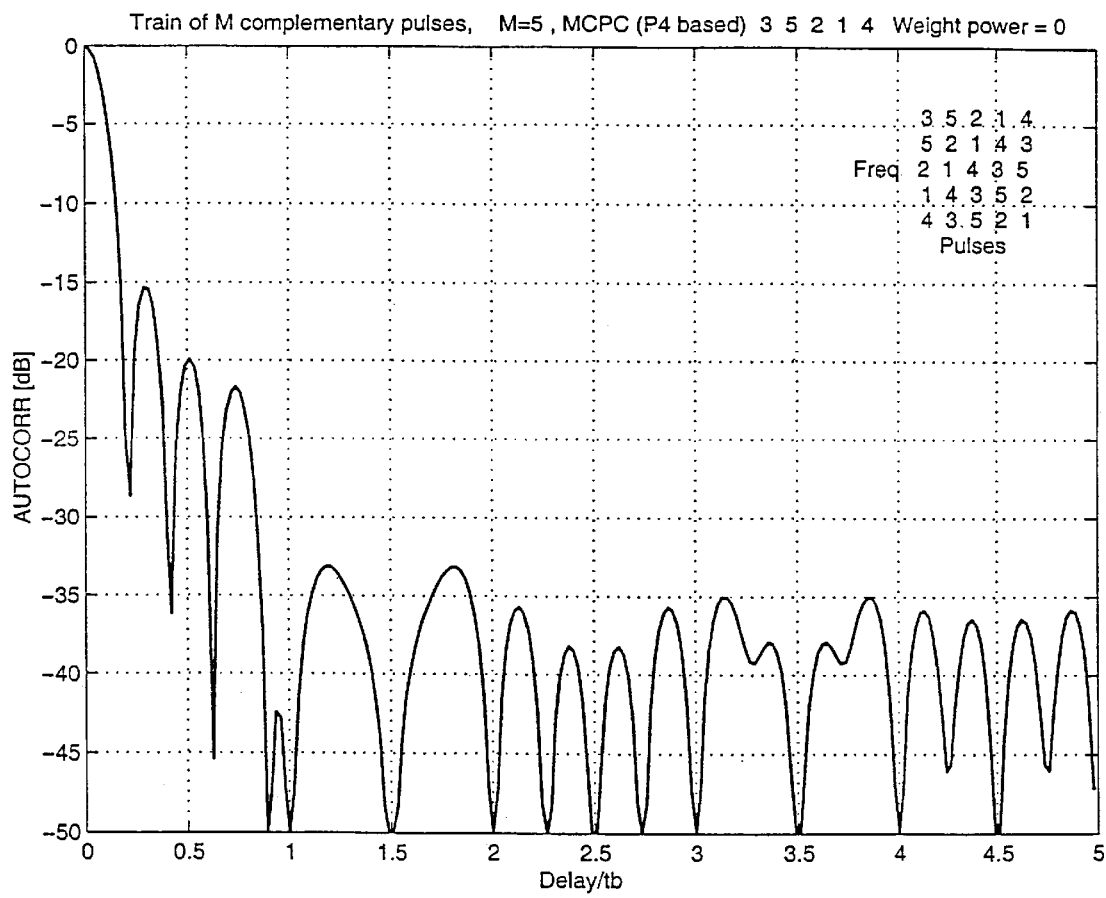
FIGS. 12 and 13 illustrate autocorrelation functions of a train of 5 MCPC pulses without and with frequency weighting, respectively.

The above feature is illustrated in FIG. 12 showing the autocorrelation function of a train of 5 MCPC pulses (the order of sequences is indicated in the figure). It can be seen in FIG. 12 that the sidelobe-reduction applies to all but the sidelobes within the first bit. This should be expected because a complementary set yields zero autocorrelation sidelobes only for $|\tau| > t_b$. The delay axis in FIG. 12 is limited to the duration of a pulse (i.e., $Mt_b$). The autocorrelation within that delay is not affected by the pulse interval T as long as T is larger then twice the pulse width, namely $T < 2Mt_b$. What is affected by the pulse interval is the ambiguity function for non-zero Doppler.

The dramatic improvement in sidelobe reduction for $t_b < |\tau| < Mt_b$ by a train of complementary MCPC pulses justifies a method for further sidelobe-reduction in the remaining delay range of $|\tau| < t_b$. This can be achieved by applying weights along the frequency axis.

Frequency weighting is a well-established method for reducing autocorrelation sidelobes in linear FM radar signals (Farnet, E. C. and Stevens, G. H., "*Pulse Compression Radar*", Radar Handbook, $2^{nd}$ edition, Skolnik, M., Ed., (McGraw-Hill, 1990), Ch. 10. This technique appears to be not very effective in a single MCPC pulse, because it yields meaningful sidelobe reduction only over the limited delay range $|\tau| < t_b$, but does not help over the larger remaining delay range of $t_b < |\tau| < Mt_b$. However, having found out that a complementary train of MCPC pulses dramatically reduces sidelobes in that larger delay range $t_b < |\tau| < Mt_b$, it becomes obvious that the combination of the use of a complementary pulse train and frequency weighting can reduce autocorrelation sidelobes over the entire delay range $0 < |\tau| < Mt_b$.

In conventional constant-amplitude radar signals, weighting is usually implemented only at the receiver, in order not to loose the constant-amplitude property of the transmitted signal. This is effectively a deviation from matched filter processing, and results in a small signal-to-noise ratio (SNR) loss. In the case of MCPC signal, it is already of variable amplitude (but of fixed amplitude at each subcarrier). Hence, applying different amplitude to each subcarrier adds no difficulty, The different amplitude at each subcarrier is expressed by the $W_n$ terms in equation (3).

Despite the extensive knowledge regarding weighting windows, our numerical trials are limited to a simple family of weighting described as follows:

$$W_n = \left[ a_0 + a_1 \cos \frac{2\pi \left(n - \frac{1}{2}\right)}{M} \right]^\alpha, n = 1, \ldots M \quad (11)$$

Figure 13:
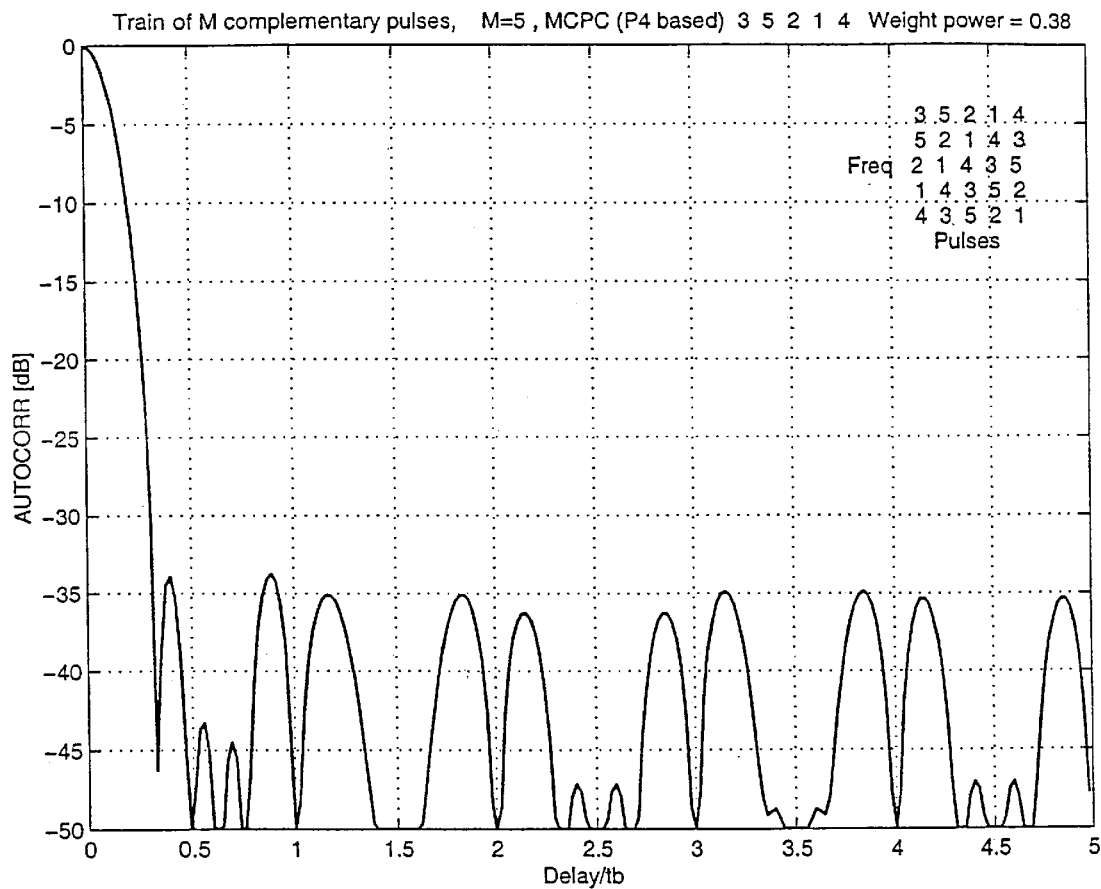

It should be noted tat setting $a_0 = 0.53836$, $a_1 = 0.46164$ and $\alpha = 0.5$ is equivalent to adding a Hamming weight window only at the receiver side. It has been found by the inventor, that values of $\alpha$ slightly different from 0.5 yield smaller peak sidelobes. The weight $W_n$ now multiplies the signal of the $n^{th}$ subcarrier (within the sum in the above equation (3)). Identical frequency weighting according to the above equation (11) was added to all the pulses in the M MCPC complementary pulse train (M=5) exemplified in FIG. 12. FIG. 13 illustrates the resulted magnitude of the autocorrelation function.

Figure 14:
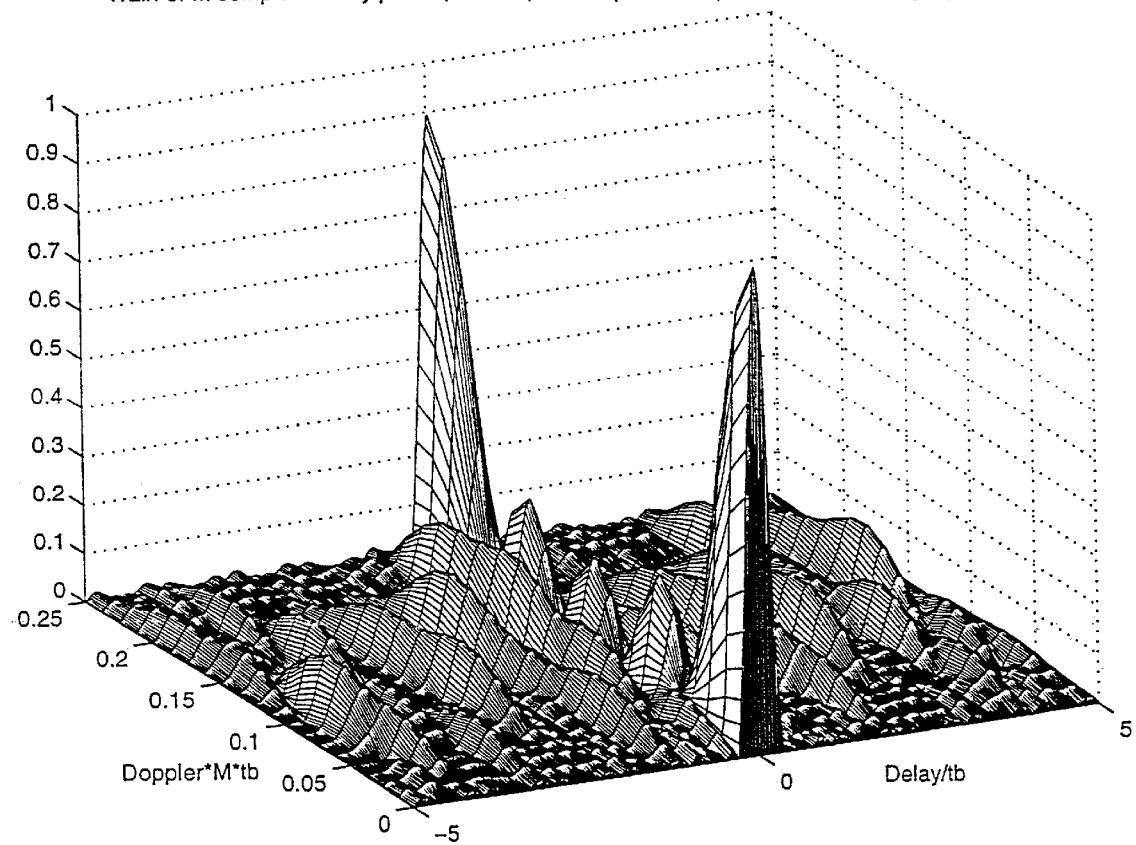
FIG. 14 illustrates the ambiguity function of the train of 5 MCPC pulses with frequency weighting.

The ambiguity function of a complementary train of M MCPC pulses, with or without frequency weighting, depends on the pulse interval T. FIG. 14 illustrates the ambiguity function obtained for an arbitrary case in which the pulse interval is 4 times the MCPC pulse duration, namely: $T = 4Mt_b$, and the weighting is according to the above equation (11). Due to the periodicity in time within a pulse train, the response in Doppler exhibits peaks at multiples of $v = 1/T = 0.25/Mt_b$, the first of which is seen in FIG. 14.

In the above examples, the MCPC complementary set is constructed based on P4 phase sequence, which is a polyphase code. However, another 2-valued phase sequences that exhibit perfect periodic autocorrelation can serve to construct a complementary set. One such alternative is the sequences described in the following publication: Golomb, S. W., "*Two-valued sequences with perfect periodic autocorrelation*", IEEE Trans. Aerosp. Electron. Syst., 1992, 28, (2), pp. 383–386.

Figure 15:
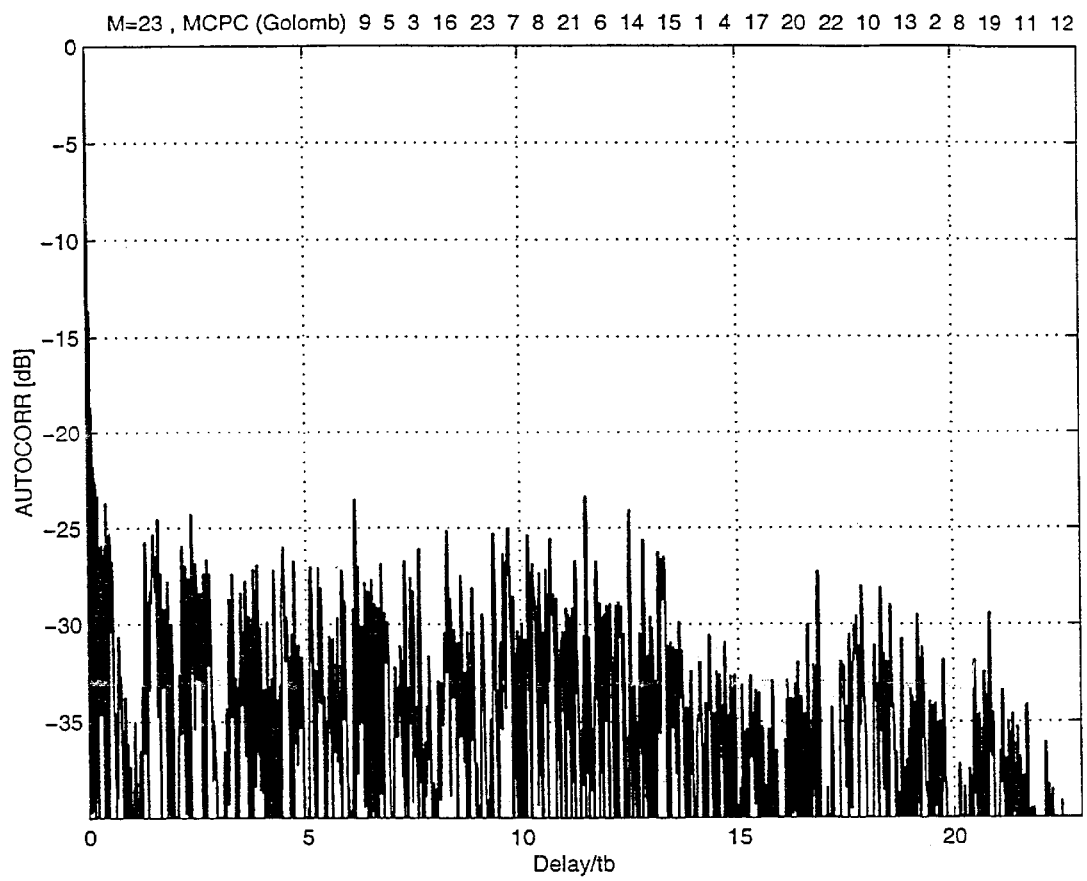
FIGS. 15 and 16 illustrate the autocorrelation function and the ambiguity function, respectively, of a 23×23 MCPC signal based on Golomb's 2-valued sequences.
Figure 16:
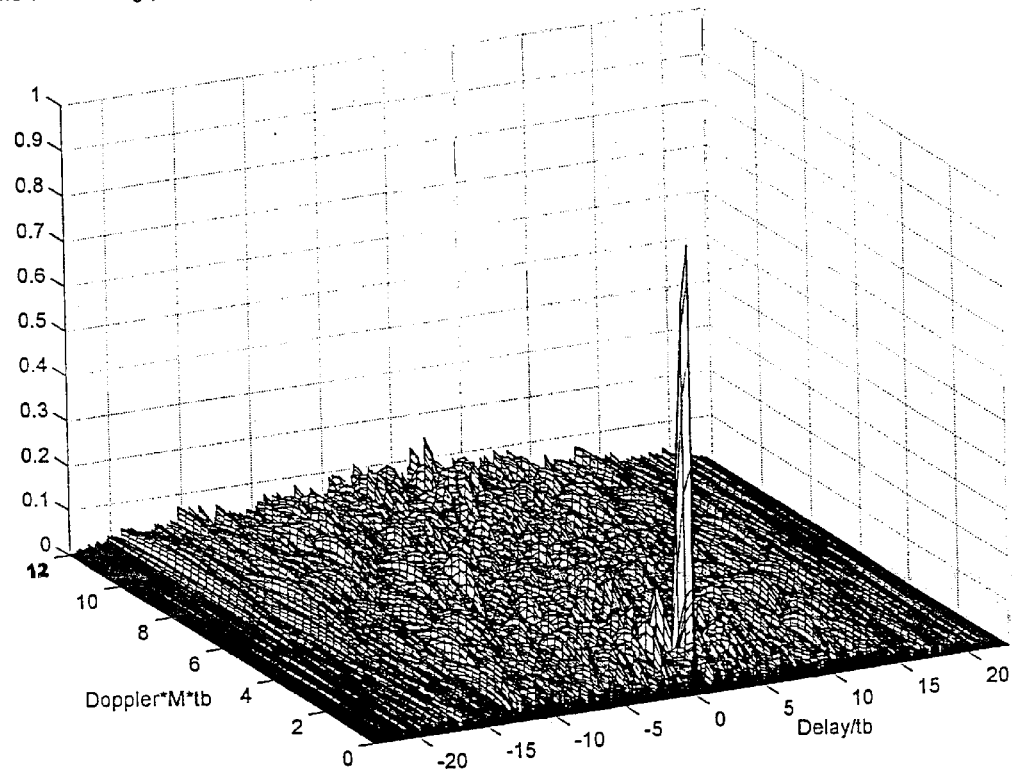
Figure 17A:
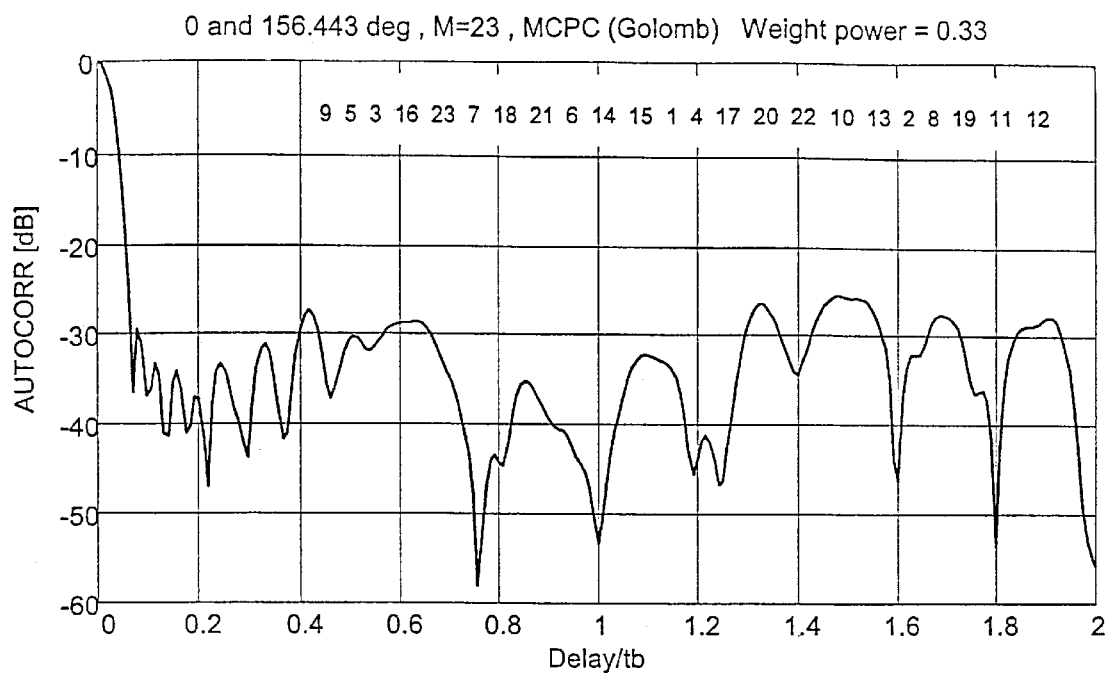
FIGS. 17A and 17B show partial autocorrelation function of the 23×23 MCPC signal with and without frequency weighting, respectively.
Figure 17B:
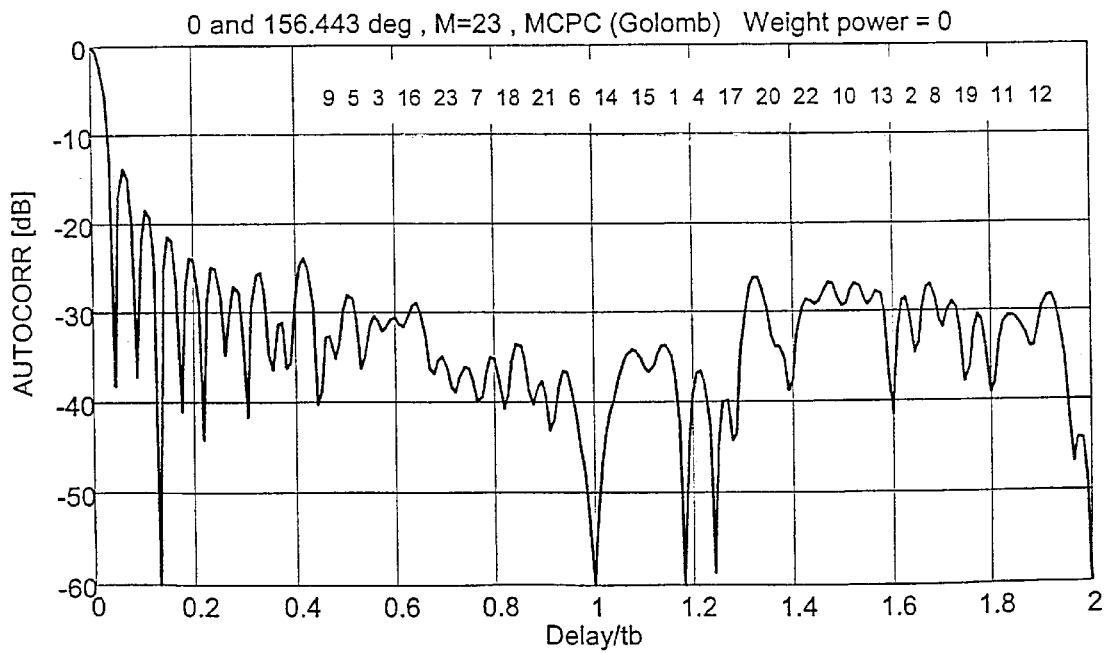

One example of such a sequence is based on Barker code of length 7 [+++--+-], in which the two phase values are not 0 and 180°, but 0 and 138.59° (i.e., equal to arccos(-¾)). Codes of this type exist for lengths 3, 7, 11, 15, 19, 23, 31, 35, 43, 47, 59, . . . FIGS. 15 and 16 illustrate the autocorrelation (magnitude) and the ambiguity function, respectively, for a 23×23 MCPC single pulse, based on all the cyclic shifts of the corresponding two-valued perfect sequence. The RMS sidelobe value of the two-valued signal is usually 15% higher than for a polyphase signal of the same size. FIGS. 17A and 17B show partial autocorrelation function of the 23×23 MCPC signal with and without frequency weighting, respectively, Adding frequency weight to the above signal alters the sidelobes, mostly within the first bit, as demonstrated in the figures that zoom on the first two bits.

It is also interesting to compare the autocorrelation of the two-valued signal with one in which the phase values were changed to 0 and 180° (not a complementary set any more, but easier to implement). Degradation in RMS value by about 25% (relative to the ideal two-valued code) is typical. As already pointed out, in all MCPC signals based on complementary sets the autocorrelation is identically zero at multiples of $t_b$. This property is lost in a non-complementary set and is one reason for the higher sidelobe RMS value.

Implementing two-valued sequences is especially simple if the two are binary values (-1, +1). There are only few square or nearly-square binary complementary sets. Some examples, known from the article "*Complementary Sets of Sequences*", Tseng, C. C. and C. L. Liu, IEEE Trans. Inf. Theor., 1972, 18, (5), pp. 644–652, are listed in Table 2 below.

TABLE 2

Complementary binary sets

| + + + | + + + + | + + − + | + − − − |
| − + + | + − + − | + − + + | − + + − + |
| + − + | + − − + | − + + + | + − − − + |
| + + − | + + − − | + + + − | − − − + − |
| (a) | (b) | (c) | (d) |

Figure 18:
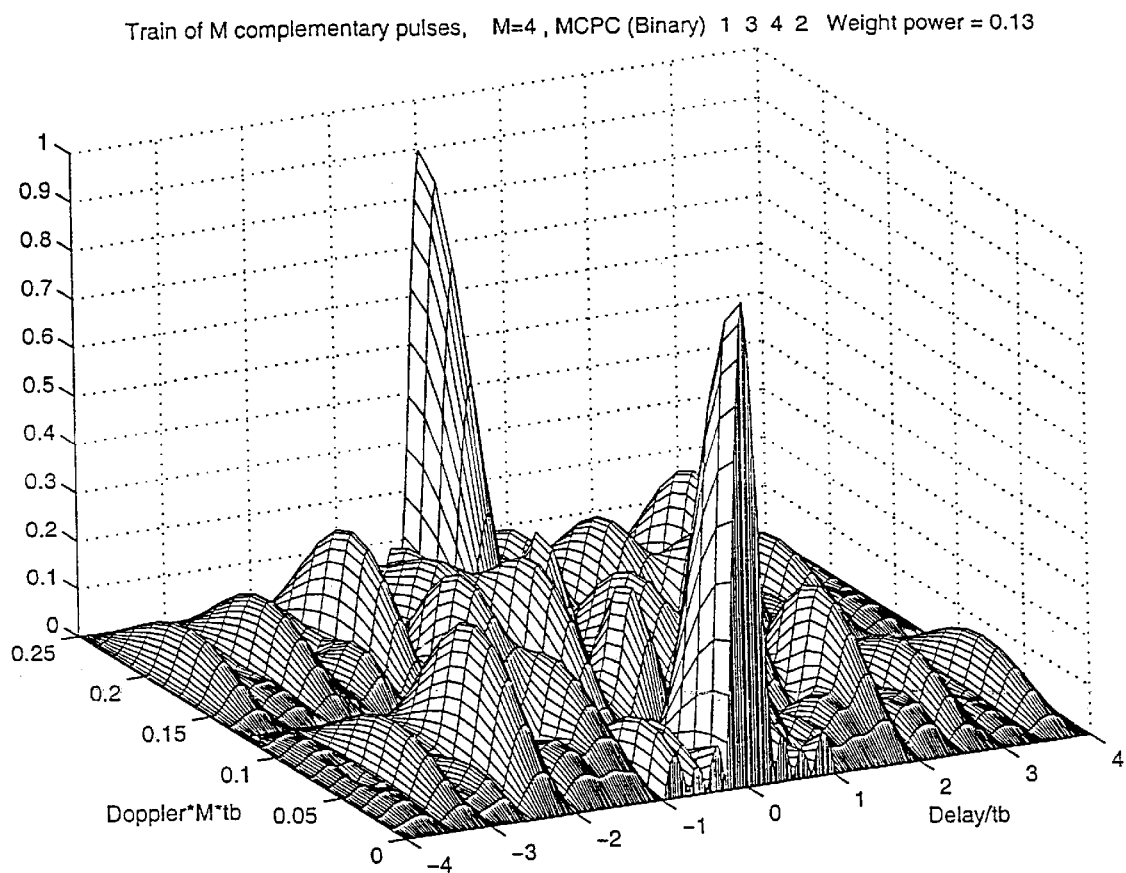
FIGS. 18 and 19 illustrate ambiguity functions of a train of 4 MCPC binary pulses for two different complementary sets, respectively.
Figure 19:
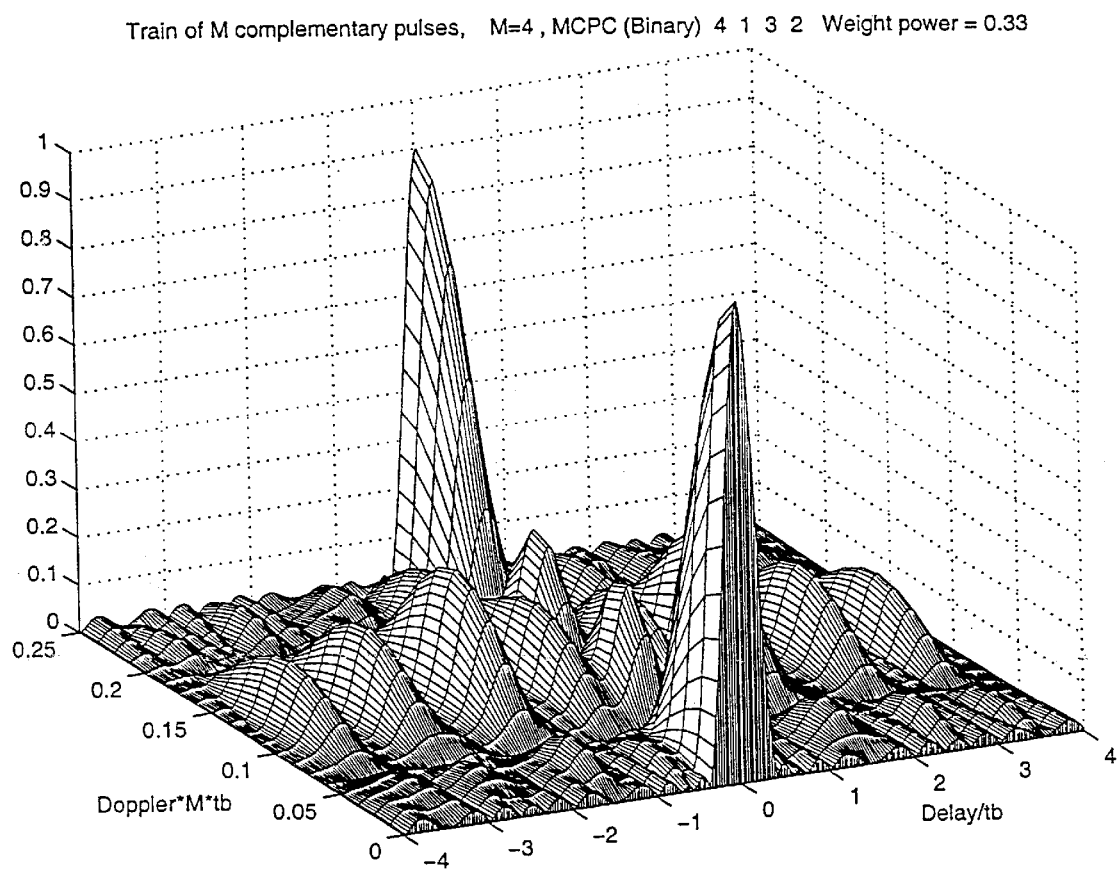

FIGS. 18 and 19 illustrate the ambiguity functions of a train of 4 complementary MCPC pulses based on the 4×4 complementary sets (b) and (c), respectively, in Table 2. It is interesting to note that the ambiguity functions are dramatically different. The ambiguity function of FIG. 18 corresponding to a frequency-weighted pulse-train based on set (b), exhibits perfect zero sidelobes for all but the first bit for zero Doppler. However, the sidelobes build up rapidly with Doppler. The ambiguity function of FIG. 19, which corresponds to a pulse train based on set (c), exhibits low (but not zero) sidelobes for all delays and for relatively wide Doppler width.

There is still another type of MCPC signals that would allow transmitting binary values (-1, +1). It requires, however, a slightly mismatched receiver. This type of MCPC signals is based on the sequences suggested by Ipatov in the following publication: Ipatov, V. P. and Fedorov, B. V., "*Regular Binary Sequences with Small Losses in Suppressing Sidelobes*", Radioelectronic and Communication Systems, 1984, 27, pp. 29–33. These signals yield perfect periodic crosscorrelation wit a slightly mismatched reference sequence. An example is the 13-length transmitted sequence[1 1 1 1 1 -1 -1 1 1 -1 1 -1 1] which yields perfect periodic crosscorrelation with the reference sequence[1 1 1 1 1 -1.5 -1.5 1 1 -1.5 1 -1.5 1].

Figure 20:
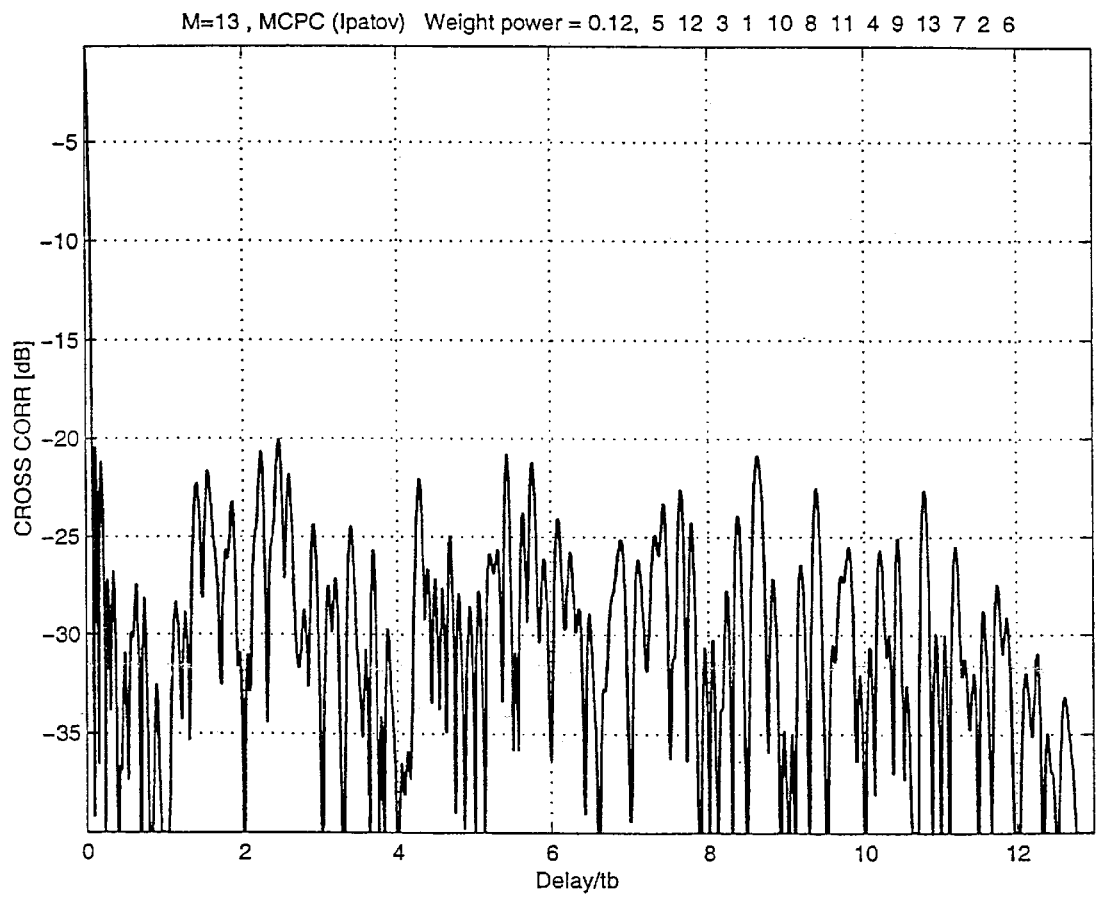
FIGS. 20 and 21 illustrate the autocorrelation function and the ambiguity function, respectively, of a 13×13 MCPC signal based on Ipatov binary signals.
Figure 21:
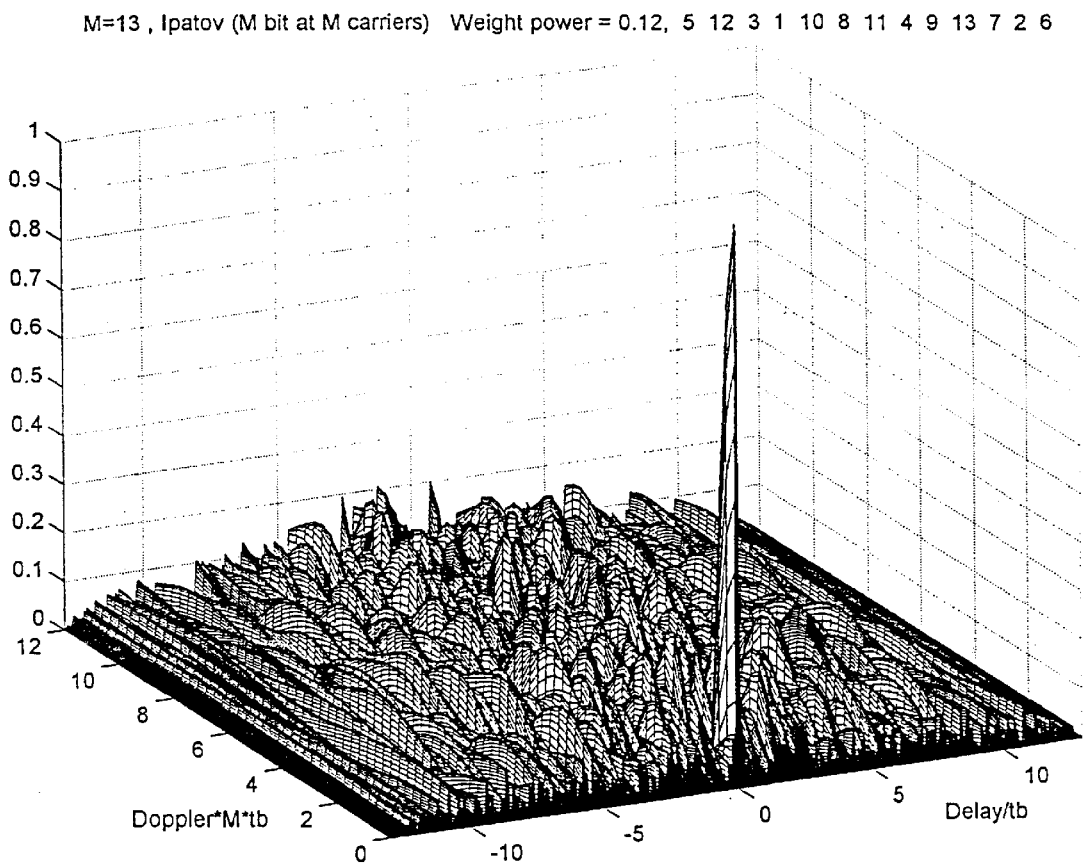

A 13×13 MCPC signal based on all the cyclic shift of the Ipatov signal outlined above, and ordered in one of 13! possible permutations, yielded the crosscorrelation (magnitude) and delay-Doppler response shown in FIGS. 20 and 21 respectively.

Let us now compare the variable amplitude of the MCPC signal with the known Huffman-coded signals. Huffman signals are constructed from N elements of width $t_c$, each one modulated in amplitude as well as in phase. The result is nearly ideal autocorrelation (zero sidelobes, except for two small peaks at the edges), which implies nearly perfect $\sin^2(\pi f t_c)/(\pi f t_c)^2$ power spectrum. The length N of the code determines the phase of the elements. The amplitude sequence is determined by the two sidelobe peaks, and by the zero pattern of the z transform of the Huffman sequence. For a given sidelobe peak level, there are $2^{N-1}$ different combinations. The zero pattern combination does not affect the autocorrelation (and, consequently, zero-Doppler cut of the ambiguity function), but affects the ambiguity function at Doppler shifts other than zero and also the real envelope of the signal.

Figure 22:
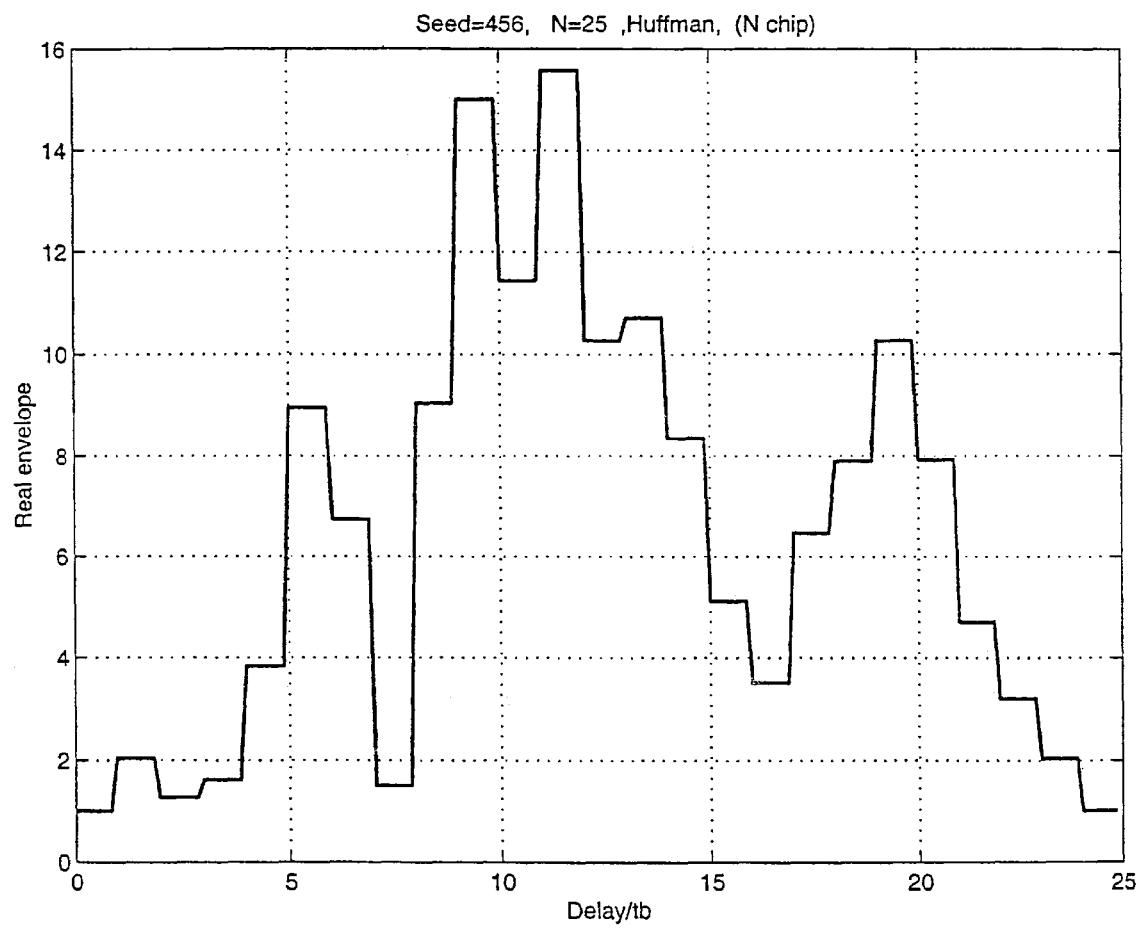
FIGS. 22 and 23 illustrate the real envelope and the ambiguity function, respectively, of a conventional 25-element Huffman signal.
Figure 23:
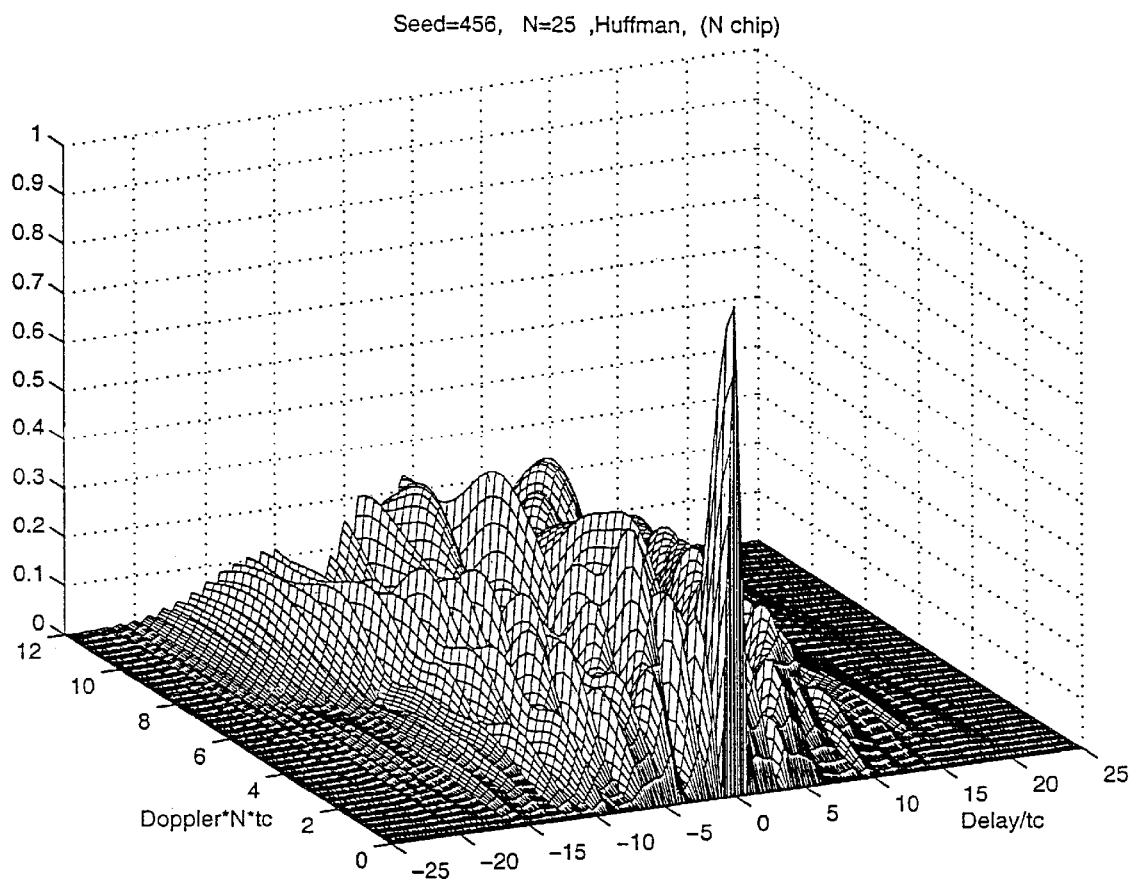

The same mainlobe width as that of M×M MCPC signal will be obtained from N-element Haffnan code, wherein $N=M^2$. An example of the real envelope and of the ambiguity function of a 25-element Huffman signal is illustrated in FIGS. 22 and 23, respectively. By definition, Huffman signals can be designed with much lower autocorrelation sidelobes than MCPC, but because of their perfect $\sin^2(\pi f t_c)/(\pi f t_c)^2$ power spectrum shape, their spectrum use is less efficient. But the major difference between Huffman and MCPC signals is with regard to implementation. A Huffman signal has to be generated as one entity and then amplified using linear amplifiers. On the contrary, an MCPG signal can be generated by passive power combination of M different signals, each one of constant amplitude.

Figure 24:
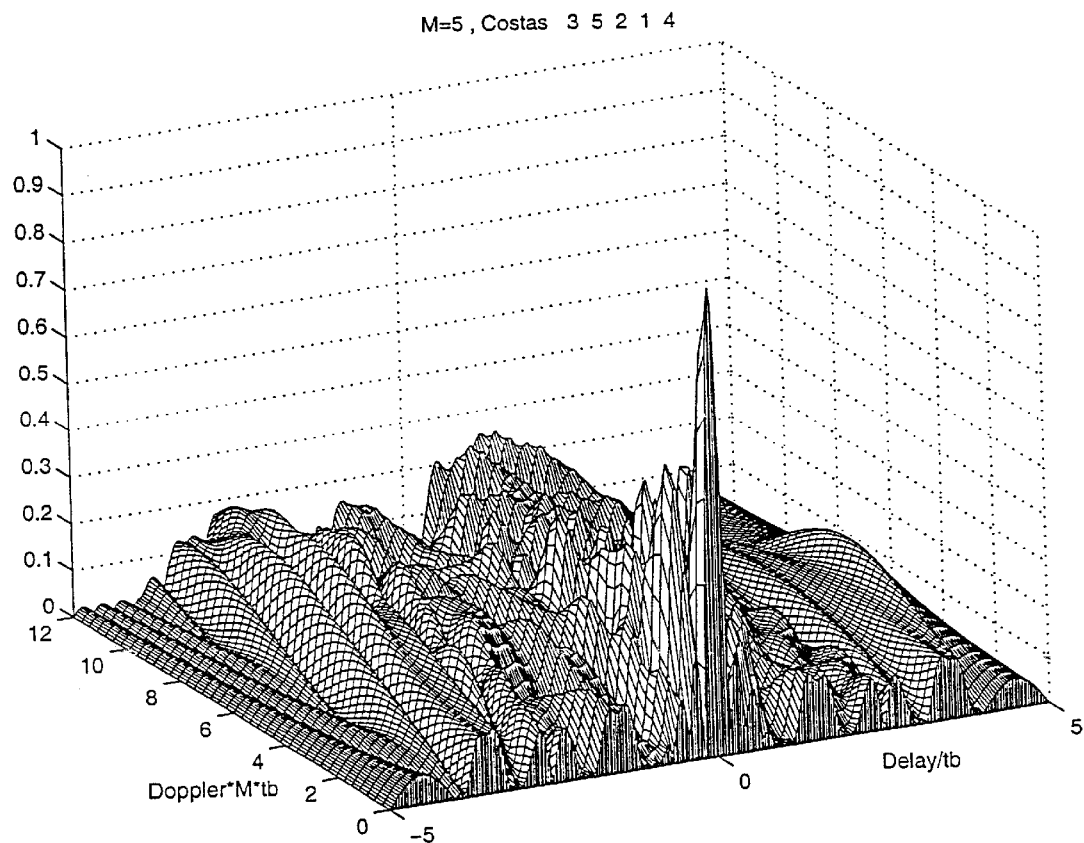
FIG. 24 illustrates the ambiguity function of a conventional 5-element Costas signal.

Following is the comparison between the MCPC signal according to the invention and Costas frequency coding. Costas signals achieve pulse compression by intrapulse frequency hopping. During any one of M code elements of duration $t_b$, only one of M frequencies is used, with no repetitions. The frequencies are separated by $1/t_b$. A Costas signal is the only other coded signal that achieves nearly rectangular spectrum, as does the MCPC signal, but Costas signals achieve that spectral efficiency while maintaining constant envelope. The first autocorrelation null of Costas signal is at $t_b/M$, like in MCPC. The autocorrelation sidelobe RMS level in Costas signals is generally slightly higher than in equally long MCPC. One example of the ambiguity function of a 5-element Costas signal is presented in FIG. 24.

Additionally, it should be noted that in order to transmit energy of $E=PMt_b$, a Costas signal requires a transmitter of power P, hoping over M frequencies, and using each frequency only for the duration of one $t_b$. On the contrary, an MCPC signal uses all the frequencies, all the time, by power combining M fixed-amplitude signals each with power P/M.

Turning back to Table 1, it is interesting to note that in the 5×5 MCPC signal exemplified therein, in the permutation with lowest sidelobes [3 5 2 1 4], isolating the 0° phase elements creates a Costas signal.

Let us now consider cross-ambiguity function between two different M×M MCPC signals. For any M×M MCPC signal, there exist M! different permutations of ordering the M sequences along the M subcarriers. The many permutations could allow nearly interference-free operation of several MCPC radar instruments in physical proximity. This could be useful in automotive radar applications. When a receiver is matched to one M×M MCPC signal, and a different M×M MCPC signal is received with delay and frequency offset (due to different oscillator frequency or Doppler), the output of the receiver as function of time-shift and frequency-shift is called the cross-ambiguity function. The desired property of cross-ambiguity is low peaks everywhere.

Figure 25:
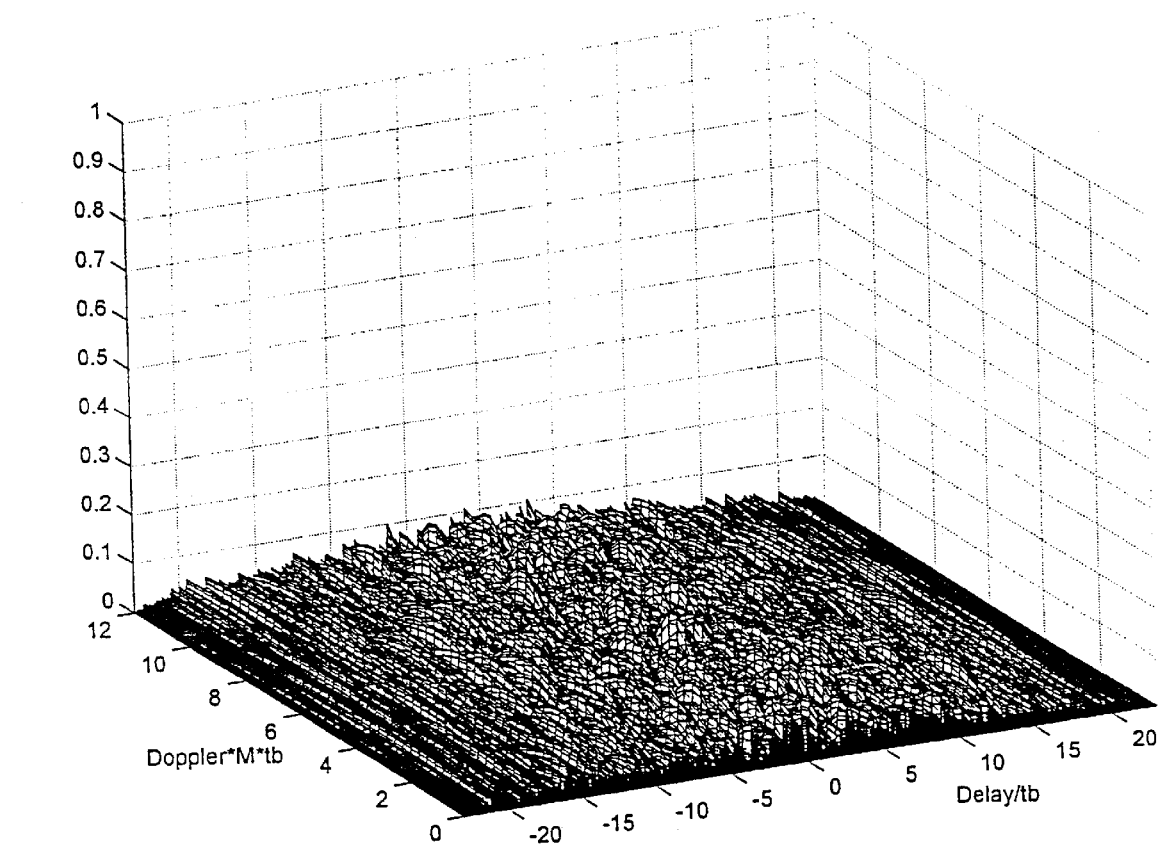
FIG. 25 illustrates a cross-ambiguity function between two permutations of a 23×23 MCPC signal based on Golomb sequences.

FIG. 25 shows an example of the cross-ambiguity function between the 23×23 MCPC signals (based on Golomb's 2-value signal of FIG. 17) and another permutation thereof, selected randomly. It should be noted that no coincidence (the same number at the same location) between the two orders guarantees a null at the origin of the cross-ambiguity function. For an M×M signal, there could coexist simultaneously M different orders with no coincidence between any two.

The advantages of a MCPC multifrequency radar signal according to the invention are thus self-evident. Similar to the known P3 and P4 signals, MCPC is a digitally phase modulated signal, but unlike P3 and P4 signals, MCPC exhibits a thumbtack ambiguity function and requires fewer phase values. Similar to Costas signal, MCPC signal utilizes many subcarriers, but unlike Costas it utilizes all the frequencies all the time. Although the MCPC is characterized by variable real envelope, it can be generated by power combining several fixed-envelope signals. This implementation option is not available for a Huffman coded signal, which is another signal with variable real envelope. While MCPC is a pulse signal, it inherits its favorable a-periodic autocorrelation from the periodic autocorrelation of the signal it is based on. Hence, the wealth of knowledge on signals with perfect periodic autocorrelation can be utilized for an a-periodic signal. Among signals with perfect periodic autocorrelation we can find long two-valued phase coded signals, and mismatched binary signals, which are easier to implement than polyphase signals. Being a multi-frequency signal, MCPC yields easily to frequency weighting useful for autocorrelation sidelobe reduction. Further sidelobes reduction can be reached by using a train of MCPC pulses, if designed to be complementary both along each pulse and along each frequency. Additionally, an M×M MCPC signal has M! different permutations. The cross-ambiguity between any pair exhibits relatively low peaks, which suggests low mutual interference between nearby radar instruments.

What is claimed is:

1. A transmitter unit for generating and transmitting a desired multifrequency phase-coded signal structure to be used in a system for detecting a remote target, the signal structure comprising at least one pulse signal in the form of a mutually complementary set of M sequences, each sequence being composed of M phase-modulated bits, wherein each two adjacent sequences are modulated on subcarriers separated by a frequency $f_s$ such that $f_s=1/t_b$, $t_b$ being a bit duration, and wherein all the subcarriers are transmitted simultaneously.

2. The transmitter unit according to claim 1, wherein said signal structure comprises a coherent train of M said pulse signals, the pulses being separated in time.

3. The transmitter unit according to claim 2, wherein each pulse in the train exhibits a different order of sequences, such that a set of complementary phase sequences is obtained in each frequency among the pulses and in each pulse among the frequencies.

4. The transmitter unit according to claim 1, wherein the subcarriers are of equal amplitudes.

5. The transmitter unit according to claim 1, wherein the amplitude of each subcarrier is different from that of at least some other subcarriers, thus implementing frequency weighting.

6. The transmitter unit according to claim 5, wherein the amplitude values of the subcarriers satisfy a symmetry condition, such that every two subcarriers have the same amplitude value.

7. The transmitter unit according to claim 3, wherein the subcarriers are of equal amplitudes.

8. The transmitter unit according to claim 3, wherein the amplitude of each subcarrier is different from that of at least some other subcarriers, thus implementing frequency weighting, provided, over all the pulses, the subcarriers with the same frequency have the same amplitude.

9. The transmitter unit according to claim 1, wherein the complementary set is constructed based on a phase sequence in the form of a polyphase code signal.

10. The transmitter unit according to claim 9, wherein the polyphase code signal is P4, determined as follows:

$$\phi_m = \frac{\pi}{M}(m-1)^2 - \pi(m-1), \quad m = 1, 2, \ldots, M$$

wherein $\phi_m$ is phase of the $m^{th}$ bit.

11. The transmitter unit according to claim 9, wherein the polyphase code signal is P3, determined as follows:

$$\phi_m = \frac{\pi}{M}(m-1)^2 - \pi(m-1), \quad m = 1, 2, \ldots, M, \quad M \text{ even}$$

wherein $\phi_m$ is phase of the $m^{th}$ bit.

12. The transmitter unit according to claim 1, wherein the bits in each sequence are two-valued phase-modulated.

13. The transmitter unit according to claim 12, wherein the complementary set is constructed based on a phase sequence in the form of Golomb code signal.

14. The transmitter unit according to claim 12, wherein the complementary set is constructed based on a phase sequence in the form of Ipatov code signal.

15. The transmitter unit according to claim 1, wherein the generation of said desired signal structure utilizes either one of M! Different permutations.

16. A radar system for detecting a remote target, the radar system comprising the transmitter unit of claim 1 for simultaneously generating M subcarrier frequencies defining together the desired phase-coded multifrequency signal structure, and a receiver matched to said signal structure.

17. A method for generating and transmitting a desired multifrequency phase-coded signal structure to be used in a system for detecting a remote target, the method comprising the steps of:

generating a mutually complementary set of M sequences each composed of M phase-modulated bits, wherein each two adjacent sequences are modulated on subcarriers separated by a frequency $f_s$ such that $f_s=1/t_b$, $t_b$ being a bit duration, and transmitting all the subcarriers simultaneously, thereby defining at least one pulse signal of said desired structure.

* * * * *

UNITED STATES PATENT AND TRADEMARK OFFICE
CERTIFICATE OF CORRECTION

PATENT NO.    : 6,392,588 B1
DATED         : May 21, 2002
INVENTOR(S)   : Nadav Levanon It is certified that error appears in the above-identified patent and that said Letters Patent is hereby corrected as shown below:

<u>Column 14,</u>
Line 31, after "$\phi_m = \pi/M\,(m-1)^2$" and before "m=1,2", please remove "$-\pi(m-1)$".

Signed and Sealed this

Twenty-fourth Day of September, 2002

Attest:

Attesting Officer

JAMES E. ROGAN
Director of the United States Patent and Trademark Office